(12) United States Patent
Onoo

(10) Patent No.: US 6,611,894 B1
(45) Date of Patent: Aug. 26, 2003

(54) DATA RETRIEVAL APPARATUS

(75) Inventor: Ryuichi Onoo, Chiba (JP)

(73) Assignee: Kawasaki Microelectronics, Inc., Chiba (JP)

( * ) Notice: Subject to any disclaimer, the term of this patent is extended or adjusted under 35 U.S.C. 154(b) by 0 days.

(21) Appl. No.: 09/276,112

(22) Filed: Mar. 25, 1999

(30) Foreign Application Priority Data

Mar. 31, 1998 (JP) .......................................... 10-087187

(51) Int. Cl.⁷ .............................................. G06F 12/02
(52) U.S. Cl. .......................... 711/5; 711/157; 711/168; 711/217; 711/219; 707/3
(58) Field of Search ............................ 711/5, 157, 168, 711/169, 217, 219; 707/3, 101

(56) References Cited

U.S. PATENT DOCUMENTS 5,748,905 A * 5/1998 Hauser et al. ............... 709/249
6,041,393 A * 3/2000 Hsu ....................... 365/230.03
6,161,144 A * 12/2000 Michels et al. ............. 370/392

* cited by examiner

Primary Examiner—Hiep T. Nguyen
(74) Attorney, Agent, or Firm—Oliff & Berridge, PLC

(57) ABSTRACT

The present invention relates to a data retrieval apparatus for retrieving the data from a number of places of data stored in memories which adopts binary search method and enables high-speed retrieval operation. The apparatus includes three memories and address converting circuits. A logical address space is divided into 2 banks of a bank constituting a set of even number addresses and a bank constituting a set of odd number addresses. Further, in the case where in respect of one bank of the 2 banks and addresses are expressed by binary numbers, the one bank is divided into a bank constituting a set of addresses where an even number of bits of "1" are present and a bank constituting a set of addresses where an odd number of bits of "1" are present. A total of the 3 banks of the logical address space are mapped in a physical address space of 3 memories. A control device carries out retrieval of data stored in the memories by binary search method by using given key data. The control device carries out the retrieval operation which including cycles of simultaneously carrying out a comparison between key data and data read from the memories and an operation of reading from the memories two pieces of data by which a successive comparison operation is scheduled from the memories.

24 Claims, 22 Drawing Sheets

FIG. 1

| TOTAL LOGICAL ADDRESS | BANK 1 PHYSICAL ADDRESS | BANK 2 PHYSICAL ADDRESS | BANK 3 PHYSICAL ADDRESS |
|---|---|---|---|
| 0 (0000B) | 0 (000B) | | |
| 1 (0001B) | | | 0 (00B) |
| 2 (0010B) | 1 (001B) | | |
| 3 (0011B) | | 0 (00B) | |
| 4 (0100B) | 2 (010B) | | |
| 5 (0101B) | | 1 (01B) | |
| 6 (0110B) | 3 (011B) | | |
| 7 (0111B) | | | 1 (01B) |
| 8 (1000B) | 4 (100B) | | |
| 9 (1001B) | | 2 (10B) | |
| 10 (1010B) | 5 (101B) | | |
| 11 (1011B) | | | 2 (10B) |
| 12 (1100B) | 6 (110B) | | |
| 13 (1101B) | | | 3 (11B) |
| 14 (1110B) | 7 (111B) | | |
| 15 (1111B) | | 3 (11B) | |

DATA RETRIEVAL APPARATUS

BACKGROUND OF THE INVENTION

1. Field of Invention

The present invention relates to a data retrieval apparatus for retrieving desired data from a number of data stored in a memory.

2. Description of Related Art

Conventionally, data retrieval apparatus are widely used. FIG. 12 is a block diagram showing an example of a conventional data retrieval apparatus that includes a control circuit 10 and a memory 20. The control circuit controls retrieval, register and deletion of data.

According to the data retrieval apparatus shown by FIG. 12, when a retrieval operation is carried out by a retrieval value KEY, the retrieval value KEY is provided as data and a retrieval start signal is transmitted. Further, when a register value INS is registered, the register value INS is provided as data and a register request signal is transmitted. Similarly, when a deletion value DEL is deleted, the deletion value DEL is provided as data and a deletion request signal is transmitted.

Although there are many methods for data retrieval, an explanation will be given for a data retrieval apparatus using a binary search method as follows.

Consider a series of data comprising a[0], a[1], a[2], ..., a[n−1]. According to the binary search method, it is assumed that the series of data is ordered in an ascending order or a descending order If the ascending order is assumed, then:

$$a[0]<a[1]<a[2]<\ldots<a[n-1].$$

The binary search method searches for an element which is equal to the retrieval value KEY from the series of data. A range of retrieval is initially from a[0] to a[n−1] (the entire series of data). In general, the binary search method is a process of dividing the series of data in 2, selecting one portion of the series of data in which the retrieval value KEY is considered to exist, further dividing the selected portion of the series of data in 2 end so on. This process is repeated and a number of elements in the retrieval range is halved at each selection. The retrieval operation is finished when a number of elements in the retrieval range becomes 1, or the retrieval value KEY coincides with a certain element of the series of data.

FIG. 13 shows a flow chart of the binary search method; FIG. 14 shows address transitions of a central element in the retrieval range; and FIG. 15 shows a timing diagram of the retrieval operation. An explanation will be given by specifically pointing out the retrieval operation of the data retrieval apparatus in reference to FIG. 13 through FIG. 15 as follows.

For example, if the series of data includes 15 elements, addresses of memory locations storing the series of data may be 0 through 14. Assume that the retrieval value is designated by notation KEY and data stored in the memory addresses 0 through 14 are respectively designated by notations MEM[0] through MEM[14]. An explanation will be given of an example of a case in which the data have the following relationships:

$$MEM[0]<MEM[1]<MEM[2]<\ldots<MEM[14];$$

and $$MEM[5]<MEM[6]<MEM[7],$$

where the retrieval value KEY coincides with data of memory address 6.

At step 1301 of FIG. 13, S=0, E=14. Here, notations S, E and M mentioned below are variables in executing the flow in which notation S designates a first address number in a retrieval range, notation E designates a final address number in the retrieval range and notation M designates an address number at a center of the retrieval range.

Next, at step 1302, the central element in the range of MEM[0] to MEM[14] is generated as M=(S+B)/2=7. Accordingly, the center element becomes MEM[7]. Then, the central element MEM[7] is read from the memory 20 (cycle 1 of FIG. 15).

At step 1303, if a number of elements in the retrieval range is E−S+1=15 which does not equal to 1, the processing is shifted to step 1304. At step 1304, the retrieval value KEY is compared with the central element MEM[7] (cycle 2 of FIG. 15) to determine whether the retrieval value KEY is greater than, equal to or less than the central element MEM[7].

If the retrieval value KEY is less than MEM[7] (KEY<MEM[7]), then the retrieval value KEY (MEM[6]) is in a range less than the central element MEM[7] and the processing is shifted to step 1305. At step 1305, the value of E is set equal to the value of M which is 7. Thus, the retrieval range becomes a range of MEM[0] through MEM[7]. Then the processing returns to step 1302.

At step 1302, a next central element of the successive retrieval range is generated. The central element at this time becomes MEM[3] which is obtained by omitting numbers less than a decimal point from M=(S+E)/2=3.5 and MEM[3] is read from the memory 20 (cycle 3 of FIG. 15). At step 1303, the number of elements in the retrieval range is 8 which does not equal to 1 and accordingly, the operation proceeds to step 1304. At step 1304, the retrieval value is compared with the central element (cycle 4 of FIG. 15) and the operation proceeds to step 1306 since KEY>MEM[3]. In the processing at step 1306, by setting S=M+1=4, the retrieval range is narrowed a range of MEM[4]through MEM[7].

Returning again to the step 1302, the central element MEM[5] is generated. At step 1303, the number of elements of the retrieval range is 4 which is not equal to 1, and accordingly, the operation proceeds to step 1304. According to the comparison at this step, KEY>MEM[5], thus the operation proceeds to step 1306 and S=M+1=6 (cycles 5, 6 of FIG. 15).

Returning again to step 1302, the central element is generated and MEM[6] is provided. At step 1303, the number of elements of the retrieval range is 2, thus the operation proceeds to step 1304 and KEY=MEM[6] is found by the comparison. Accordingly, the retrieval operation is finished (cycles 7, 8 of FIG. 15) and MEM[6] constitutes the retrieval result.

Next, an explanation will be given of operation of registering data.

FIG. 16 shows an outline of operation in registering a register value INS into a series of effective data of a[0] through a[11]. For this example, INS is larger than a[5] and smaller than a[6], that is, a [5]<INS<a[6].

The series of data must always be stored in memory in an ascending (or descending) order such that retrieval of data can be carried out. Therefore, in registering data, a position in memory where data is to be registered must be searched and a free memory location for the register data to be inserted must be obtained by shifting data already in the memory one by one and thereafter, the register data to be inserted must be written into the free memory location. Data registering operation is provided with the insertion operation described above when there is not an element which is equal to the register value in a series of data and is provided with an overwriting operation when there exists an element which is equal to the register value.

FIG. 17 shows a flow chart of the registering operation which includes both the insertion and overwriting operations. FIG. 18 shows operational timings of the registering operation. An explanation will be given by pointing out a specific example of registering operation of data in reference to FIG. 17 and FIG. 18.

Assume that there are 15 elements in the series of data. Thus, addresses of memory locations of the series of data may be designated by 0 through 14. Also assume that 12 elements of effective data are stored at addresses 0 through 11 is an order according to the size of each of the effective data. That is, when the number of the effective data is designated by notation m (i.e., m=12) and when the data is represented by MEM[0] through MEM[11], there is established a relationship of MEM[0]<MEM[1]<MEM[2]< . . . <MEM[11]. Thus, nothing is registered at address 12 and thereafter. Consider here a case in which a register value is designated by notation INS and MEM[5]<INS<MEM[6].

At step 1701 of FIG. 17, retrieval operation is carried out with the register value INS as a retrieval value (cycle 1 through cycle 8 of FIG. 18). Overwriting operation is carried out when there is an element in coincidence with the register value INS. When an address storing a coincident element is designated by M, then INS is written to MEM[M] (steps 1702, 1709). However, assume as an example that there is no element in coincidence with the register value INS. Then an insertion operation is carried out and an insertion address is M=6 (step 1702).

At step 1703, S=m−1=11, D=m=12, and E=M=6. In this case, notation m designates a number of registered data and notation M designates an address of the inserting data as mentioned above. Notations S, D and E represent variables in executing the flow as mentioned above.

In steps 1704–1707, movement of data is carried out. At step 1704, a determination is made of whether the movement of data is finished. For the above example, E<D, accordingly, data at address 11 is read (step 1705; cycle 9 of FIG. 18) and is written to address 12 (step 1706, cycle 10). At step 1707, S and D are updated and S=10 and D=11. Operation of step 1704 to step 1707 is repeated until E=D (cycles 11 through 20).

At step 1704, when E=D=6, the original data MEM[6] through MEM[11] have been moved from addresses 6 through 11 to addresses 7 through 12. Finally, at step 1708, the effective element number m is incremented by 1 (step 1708) and the register value INS is written to address M where M=6 (step 1709, cycle 21).

Next, an explanation will be given of deletion of data.

FIG. 19 shows an outline of an operation when a portion of deletion data DEL is deleted from the 12 elements of the series of effective data of a[0] through a[11]. Also in deleting data, data must be stored in memory in an ascending (or descending) order such that retrieval operation can be carried out. Accordingly, a position of data to be deleted must be searched and a space of deleted data must be filled by shifting data in the memory one by one.

FIG. 20 shows a flow chart of the data deleting operation and FIG. 21 shows a timing diagram of the deleting operation. An explanation will be given by way of a specific example in reference to FIG. 20 and FIG. 21.

Assume that a number of data of a series of data is 15. Thus, addresses of the series of data in memory may be 0 through 14 and assume that 12 effective data are stored in addresses 0 through 11 in the memory. If m is a total number of effective data, then m=12. If the effective data is represented by MEM[0] through MEM[11], then MEM[0]<MEM[1]<MEM[2]< . . . <MEM[11] and nothing is registered at address 12 and thereafter. In this case, a deletion value is designated by notation DEL. For the following discussion, assume that MEM[5]<DEL=MEM[6]<MEM[7].

First, at step 2001, a retrieval operation is carried out with the deletion value DEL as a retrieval value (cycle 1 through cycle 8 of FIG. 21). If there is no element in coincidence with the deletion value DEL, the deleting operation cannot be carried out and therefore, the processing is finished.

Assume that there exists an element in coincidence with the deletion value DEL. At step 2002, if an address storing a coincident element is designated by notation M, then MEM[M] constitutes a deletion object. At this point in the example, M is 6 as mentioned above.

At step 2003, S, D and E are set as: S=M+1=7, D=M=6, E=m=12, and the operation proceeds to step 2004 to determine if a movement of data is completed. If the movement of data is not completed, the operation proceeds through steps 2004, 2005, 2006 and 2007 until the movement of data is completed.

At this point in the example, E>D. Accordingly, address 7 is read (step 2005, cycle 9) and is written to address 6 (step 2006, cycle 10). At step 2007, S and D are updated as S=S and D=7. The operation proceeds from step 2004 to step 2007 until E=D (cycles 11 through 18).

At step 2004, when E=D=12, the original data MEM[7] through MEM[11] at addresses 7 through 11 are moved to addresses 6 through 10. At step 2008, the effective element number m is decremented by 1.

By the above-described operation, data retrieval as well as register and deletion of data are carried out based on the binary search method. According to the retrieval operation by the binary search method, as shown by, for example, FIG. 15, reading of data from a memory and comparison between the read data and the retrieval value KEY are carried out alternately and memories are not used during substantially a half time period of the retrieval operation which is wasteful.

SUMMARY OF THE INVENTION

In view of the above-described situation, it is an object of the invention to provide a data retrieval apparatus adopting binary search method and capable of carrying out high-speed retrieval operation.

In order to achieve the above-described object, according to an aspect of the invention, there is provided a data retrieval apparatus comprising:

3 or 4 memories;

an address converting circuit in which in a case where a logical address space is divided into 2 banks of a bank constituting a set of even number addresses and a bank constituting a set of odd number addresses and either or both of banks of the two banks are expressed by binary numbers and are divided into a bank constituting a set of addresses where an even number of bits of "1" are present and a bank constituting a set of addresses where an odd number of bits of "1" are present, a total of 3 or 4 banks of the logical address space are mapped in physical address spaces of respectives of the 3 or 4 of memories; and a control circuit which is a control circuit for carrying out a retrieval of data stored to the memories by a binary search method by using a given key data and which carries out the retrieval including a cycle simultaneously executing a comparison of the key data with the data read from the memories and an operation of reading from the memories two pieces of the data which are scheduled to carry out the comparison successively.

Further, according to a data retrieval apparatus of other aspect of the invention achieving the above-described object, the memories store the data by aligning the data in an ascending order or a descending order, the retrieval apparatus retrieves an insertion position or a deletion position, further, moves data at an address at an order higher than that of the insertion position to a higher order side by 1 address in inserting data and moves data at an order higher than an order of an address where data to be deleted is disposed to a lower order side by 1 address in deleting data in order to maintain an aligned state.

Further, according to a data retrieval apparatus of other aspect of the invention achieving the above-described object, the memories are constituted by a region for storing register data constituting an object of the retrieval and a region storing associative data accompanied to a result of the retrieval of the register data.

Further, according to other aspect of the invention achieving the above-described object, there is provided a data packet distributing system comprising:

an address data obtaining circuit for sampling address data from a data packet;

a data retrieval apparatus for carrying out a comparison between the sampled address data and register data stored in memories and an operation of reading the register data constituting an object of a successive comparison in a same cycle; and a distributed destination data forming circuit for forming distributed destination data in reference to a retrieval finish signal, a coincidence signal and coincidence data constituting a result of retrieval of the data retrieval apparatus.

Further, according to other aspects of the invention, there is a method for searching for a retrieval key in a plurality of data elements that are stored in an order based on magnitudes of the data elements, comprising:

(a) retrieving a center data element from the data elements;

(b) concurrently comparing the center data element with the retrieval key to generate a compare result, and retrieving a greater data element and a lesser data element from the data elements;

(c) selecting either the greater or the lesser data elements as the center data element based on the compare result; and (d) repeating steps (b) and (c) until a desired difference between addresses of the greater and the lesser data elements is reached; and (e) outputting a retrieval address of a last center data element.

The above method further comprising:

storing data elements having even logical addresses in a first memory;

storing data elements having odd logical addresses that have binary values with an even number of "1"s in a second memory; and storing data elements having odd logical addresses that have binary values with an odd number of "1"s in a third memory, the first, second and third memories being independently readable.

In addition, the method further comprising:

storing data elements having even logical addresses that have a binary value with an even number of "1"s in the first memory; and storing data elements having even logical addresses that have a binary value with and odd number of "1"s in a fourth memory.

BRIEF DESCRIPTION OF THE DRAWINGS

FIG. 1 is a diagram showing a corresponding relationship between logical addresses and physical addresses when a logical address space is divided into 3 banks;

DETAILED DESCRIPTION OF PREFERRED EMBODIMENTS

A detailed explanation will be given of an embodiment according to the invention as follows.

In this case, as an embodiment of the invention, logical addresses of all memories are firstly divided into the following two groups:

(I) Even number memory addresses; and (II) Odd number memory addresses,

Group (II) is further divided in two sub-groups in accordance with the following rules.

(II-I) include memory addresses where each of the addresses has a binary value in which a number of bits of "1" is an even number.

(II-II) include memory addresses where each of the addresses has a binary value in which a number of bits of "1" is an odd number.

In this way, the logical address space is divided into three banks (1–3). Physical addresses are allocated to the three banks of the memory as follows:

(1) In the above-described Group (I) (bank 1), addresses having a least significant bit of 1 are omitted; and (2) In the two above-described sub-groups (II-1) and (II-2) (banks 2 and 3), addresses having two at least significant bits of the logical address are omitted. For example, logical addresses and physical addresses of the three banks 1–3 are allocated as shown by FIG. 1 when a total of the logical addresses are 0 through 15 ($0000_a$ through $1111_a$).

Figure 2:
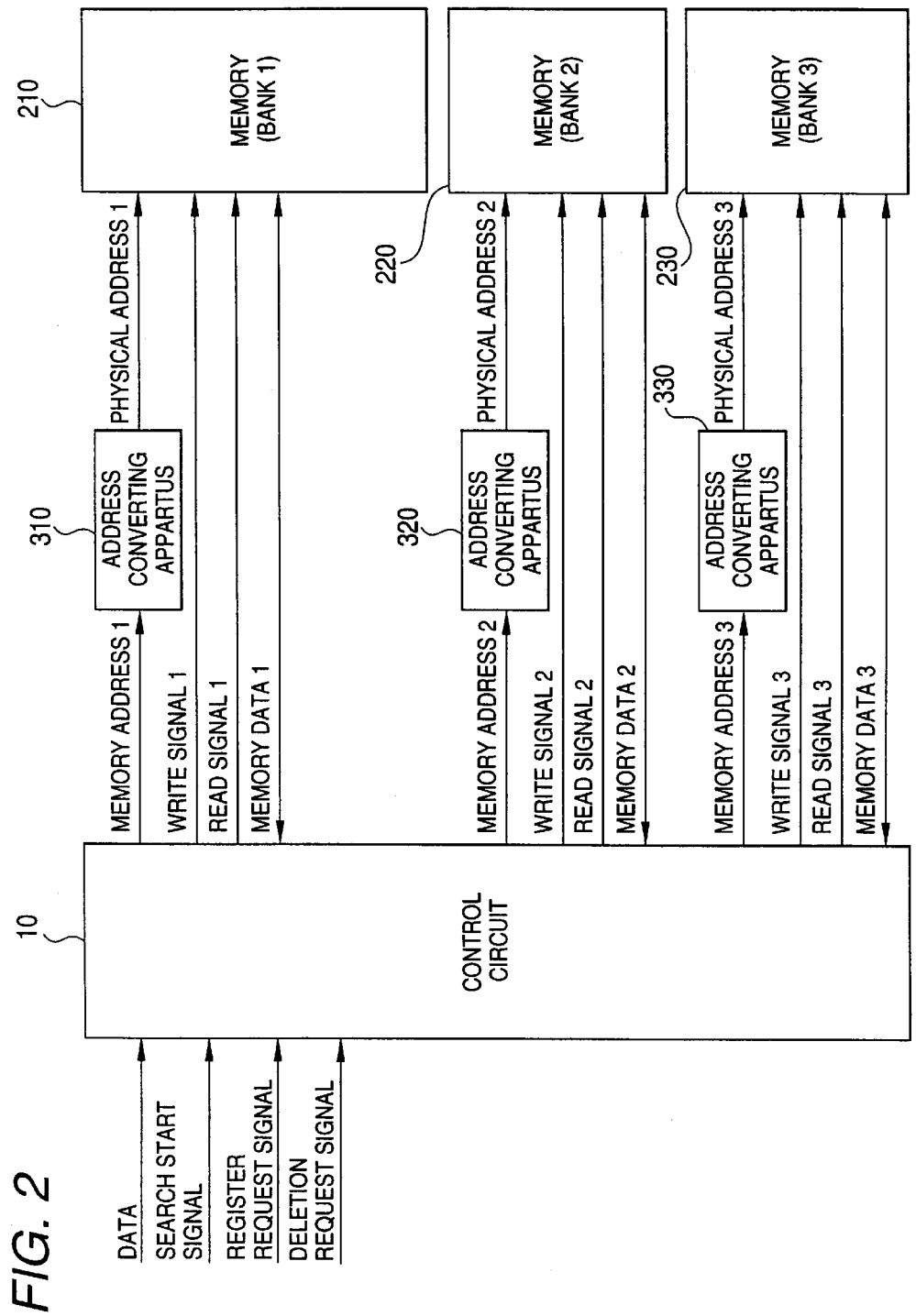
FIG. 2 is a block diagram showing a constitution of an embodiment of a data retrieval apparatus according to the invention.

FIG. 2 is a block diagram showing a constitution of an embodiment of a data retrieval apparatus according to the invention. The data retrieval apparatus shown by FIG. 2 is constituted such that access can be made independently and simultaneously to the above-described three banks 1–3. Three memories 210, 220 and 230 are provided in correspondence with banks 1, 2 and 3. Further, a total of three of address converting apparatus 310, 320 and 330 for converting a logical address into a physical address are provided in correspondence with the memories 210, 220 and 230.

Similar to the previously shown example, assume that addresses of memories are 0 through 14, a retrieval key data is designated by notation KEY, data stored in the memory addresses 0 through 14 are respectively designated by notations MEM[0] through MEM[14] and the data are stored so that MEM[0]<MEM[1]<MEM[2] . . . <MEM[14]. An example of a binary search operation will be given for this example assuming that MEM[5]<KEY=MEM[6]<MEM[7].

Figure 3:
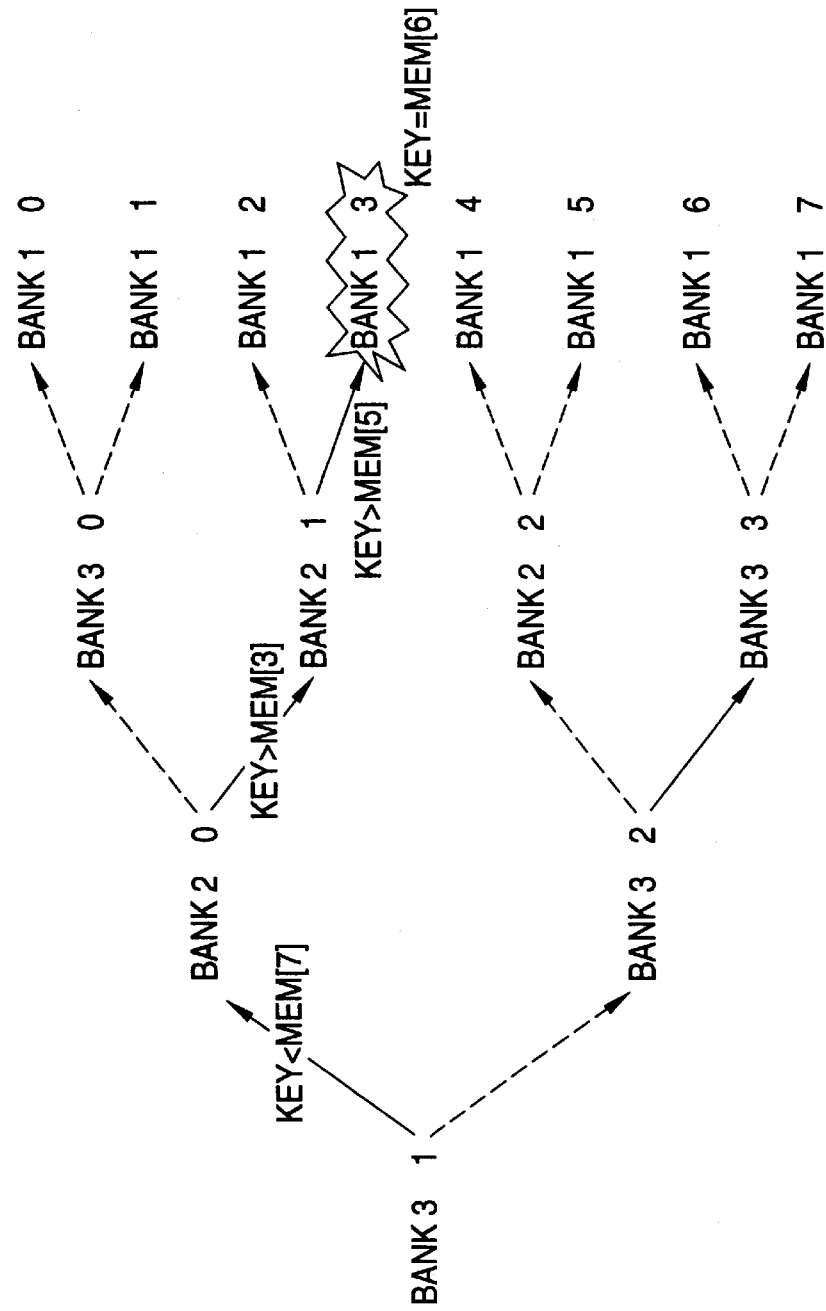
FIG. 3 is a diagram representing transition of an address of a central element in a retrieval range according to the embodiment by banks and their physical addresses.
Figure 4:
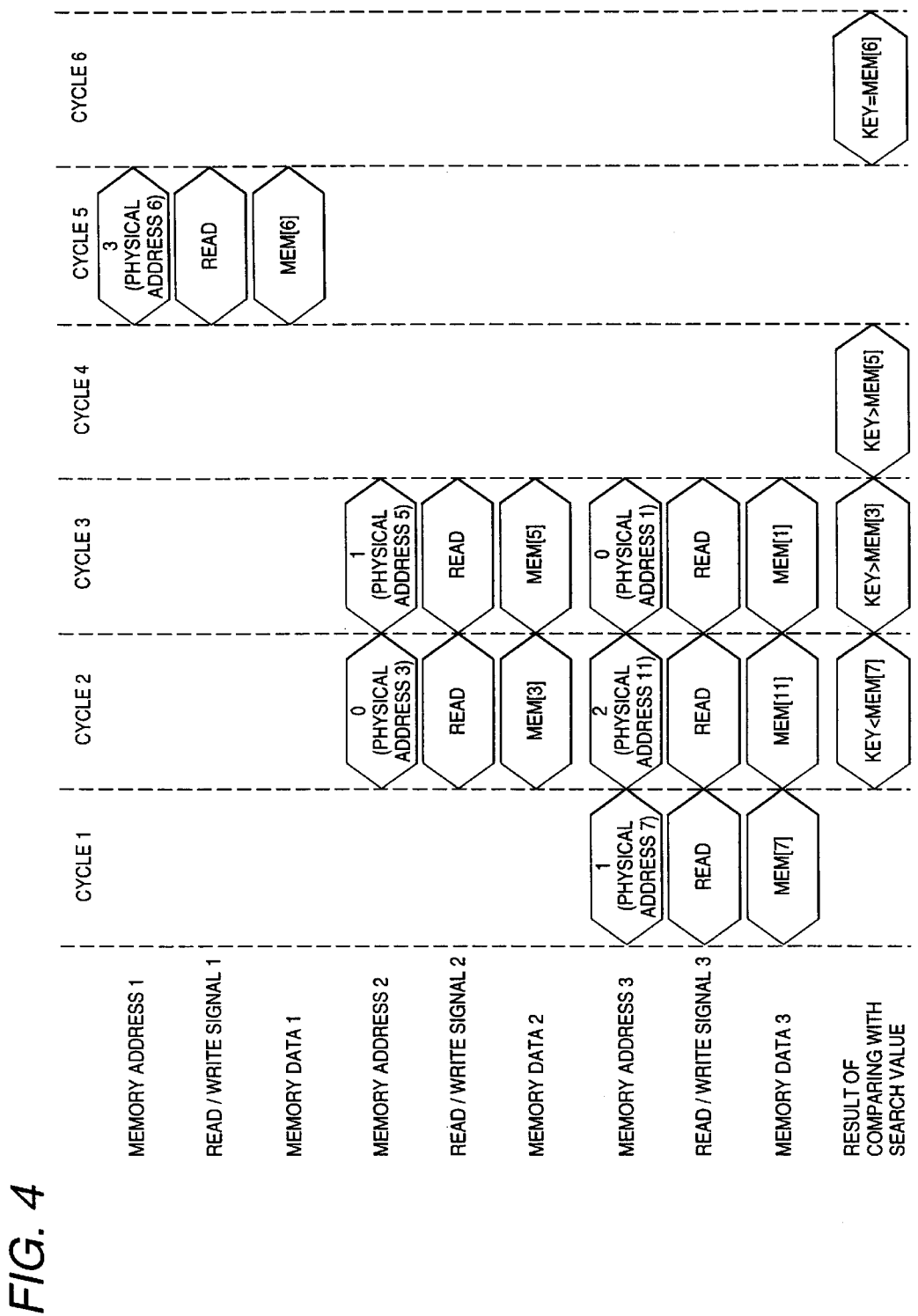
FIG. 4 is a diagram showing timings of retrieval operation according to the embodiment.
Figure 14:
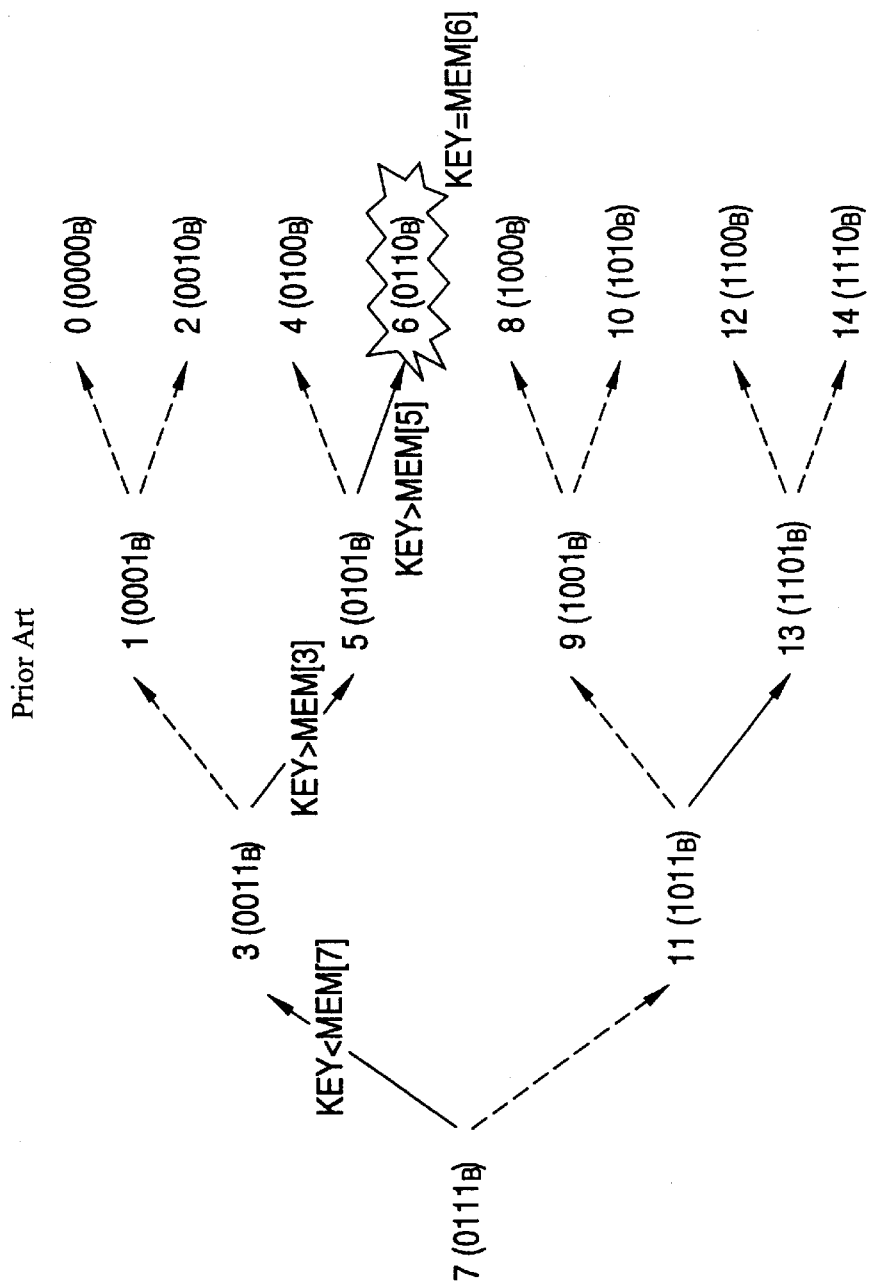
FIG. 14 is a diagram showing transition of an address of a central element in a conventional retrieval range.

The address transition in this case is carried out as shown by FIG. 14. The transition is expressed by the banks and the physical addresses as shown by FIG. 3. FIG. 4 shows a timing diagram of the retrieval for this example where access can be made simultaneously from the memories of the banks 1, 2 and 3.

Figure 5:
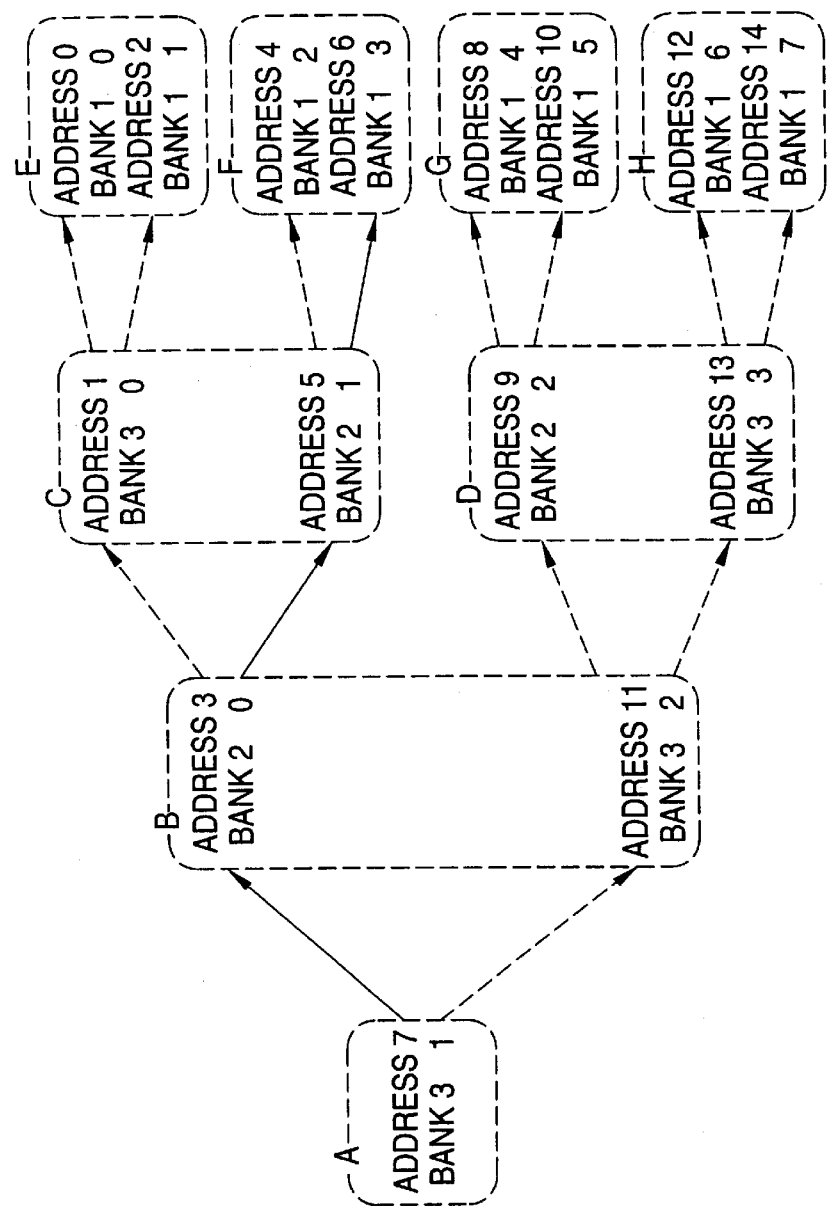
FIG. 5 is a diagram representing transition of an address of a central element of a retrieval range according to the embodiment by a set of address pairs each comprising two addresses which are alternatively selected.
Figure 15:
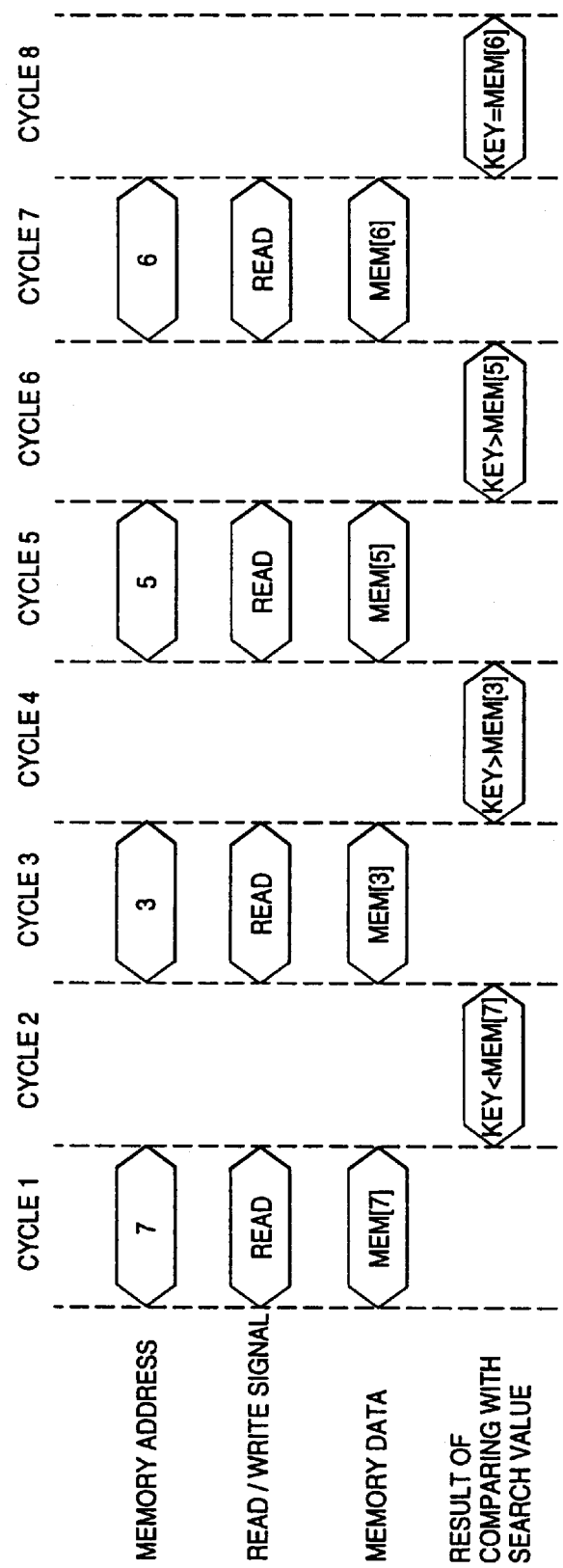
FIG. 15 is a diagram showing timings of a conventional retrieval operation.
Figure 16:
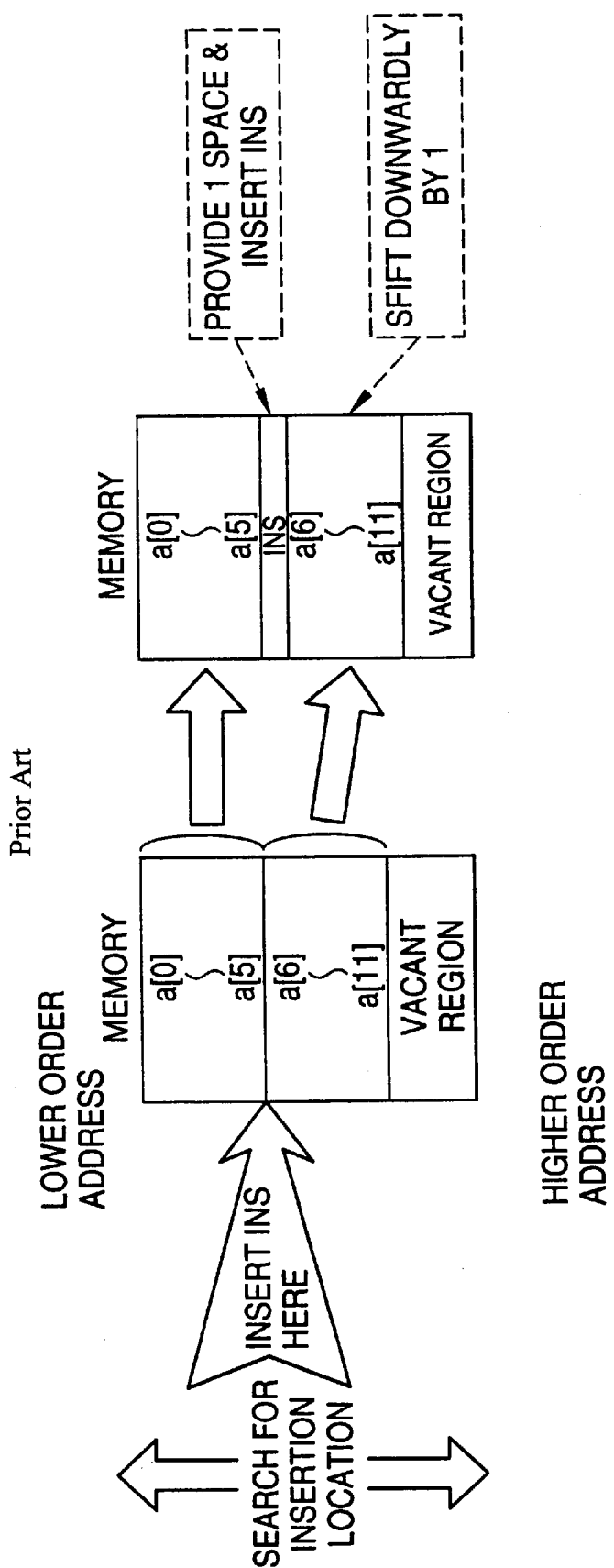
FIG. 16 is a diagram showing an outline of a register operation.
Figure 17:
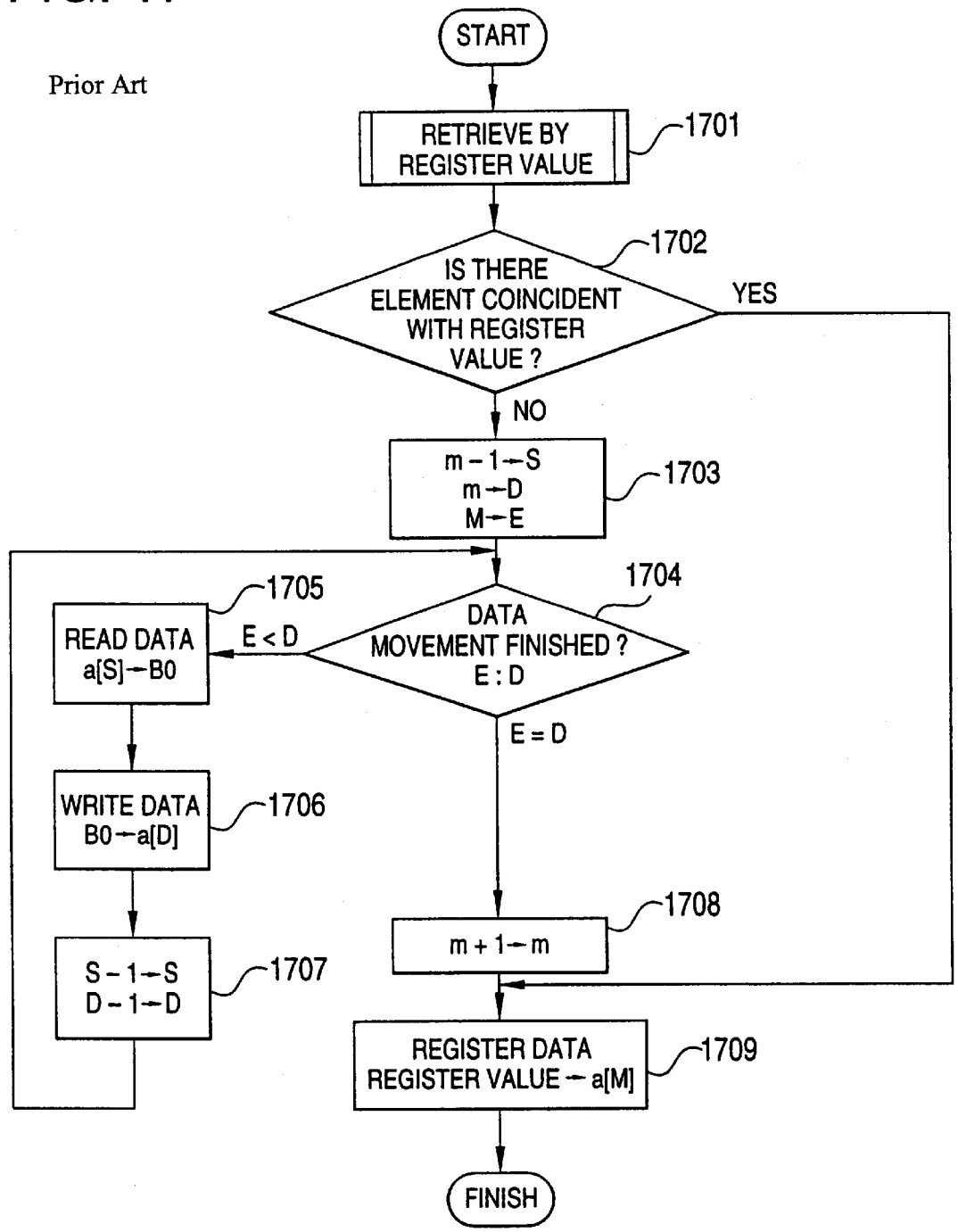
FIG. 17 is a diagram showing a flow of a conventional register operation.
Figure 18:
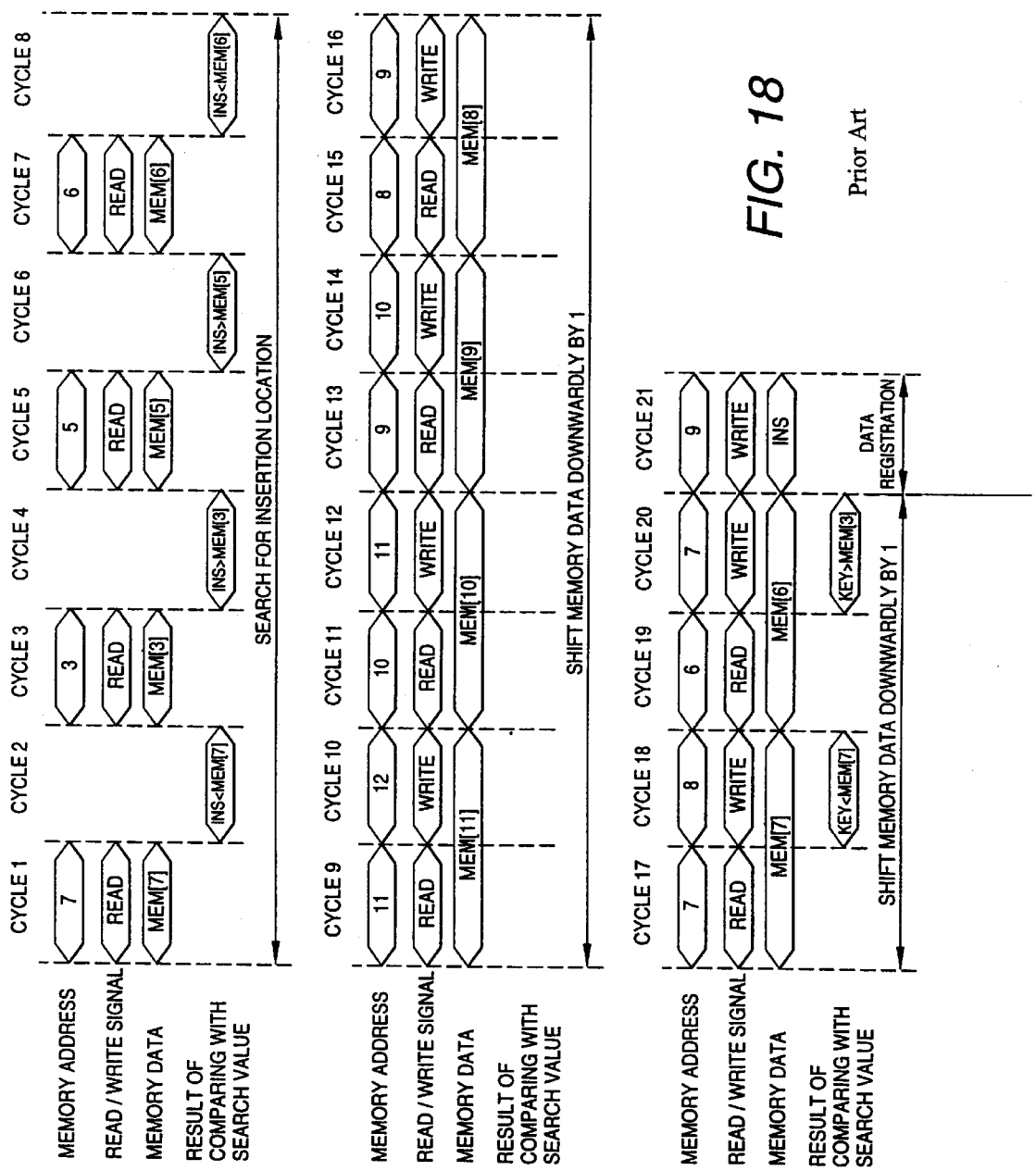
FIG. 18 is a diagram showing operational timings of the conventional register operation.
Figure 19:
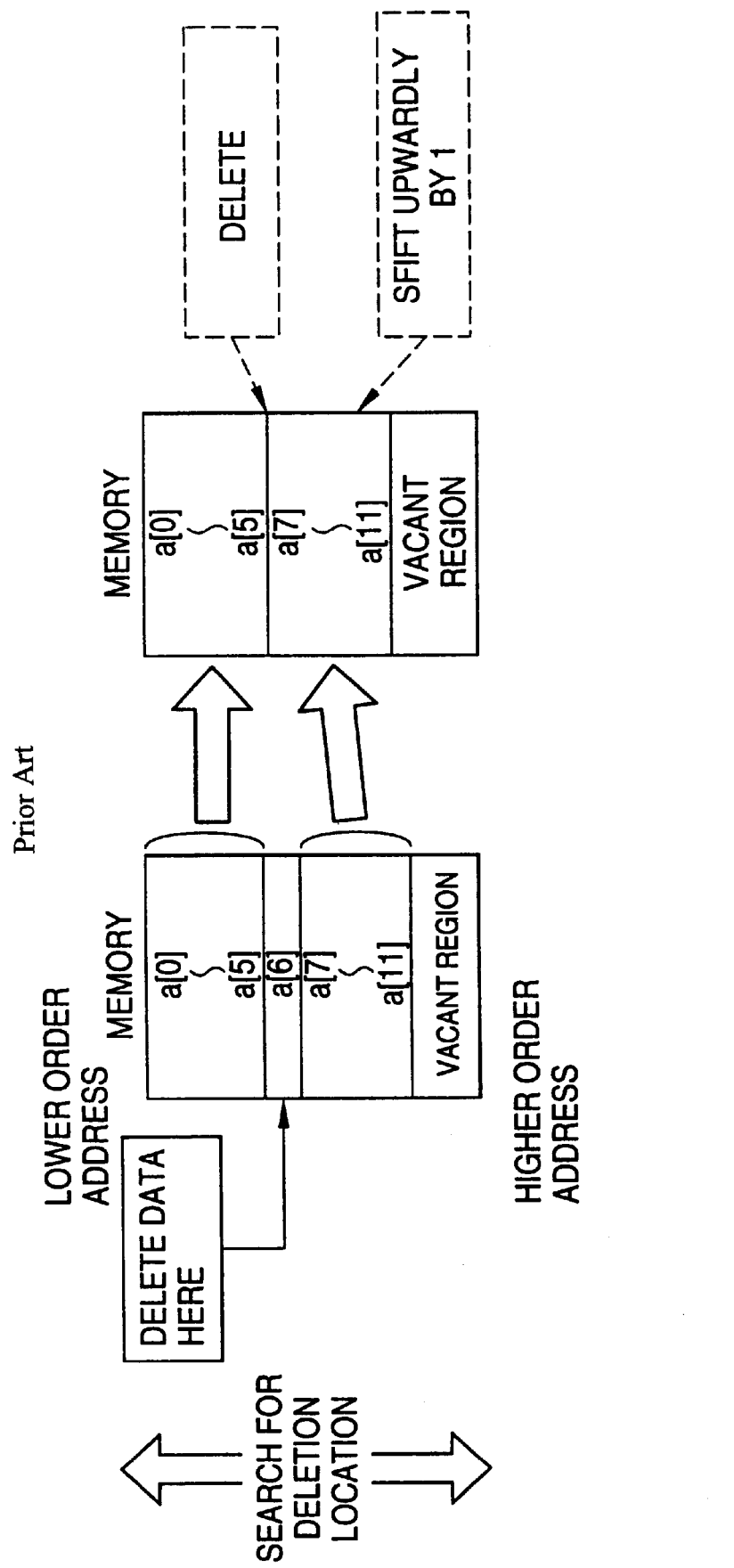
FIG. 19 is a diagram showing an outline of a deletion operation.
Figure 20:
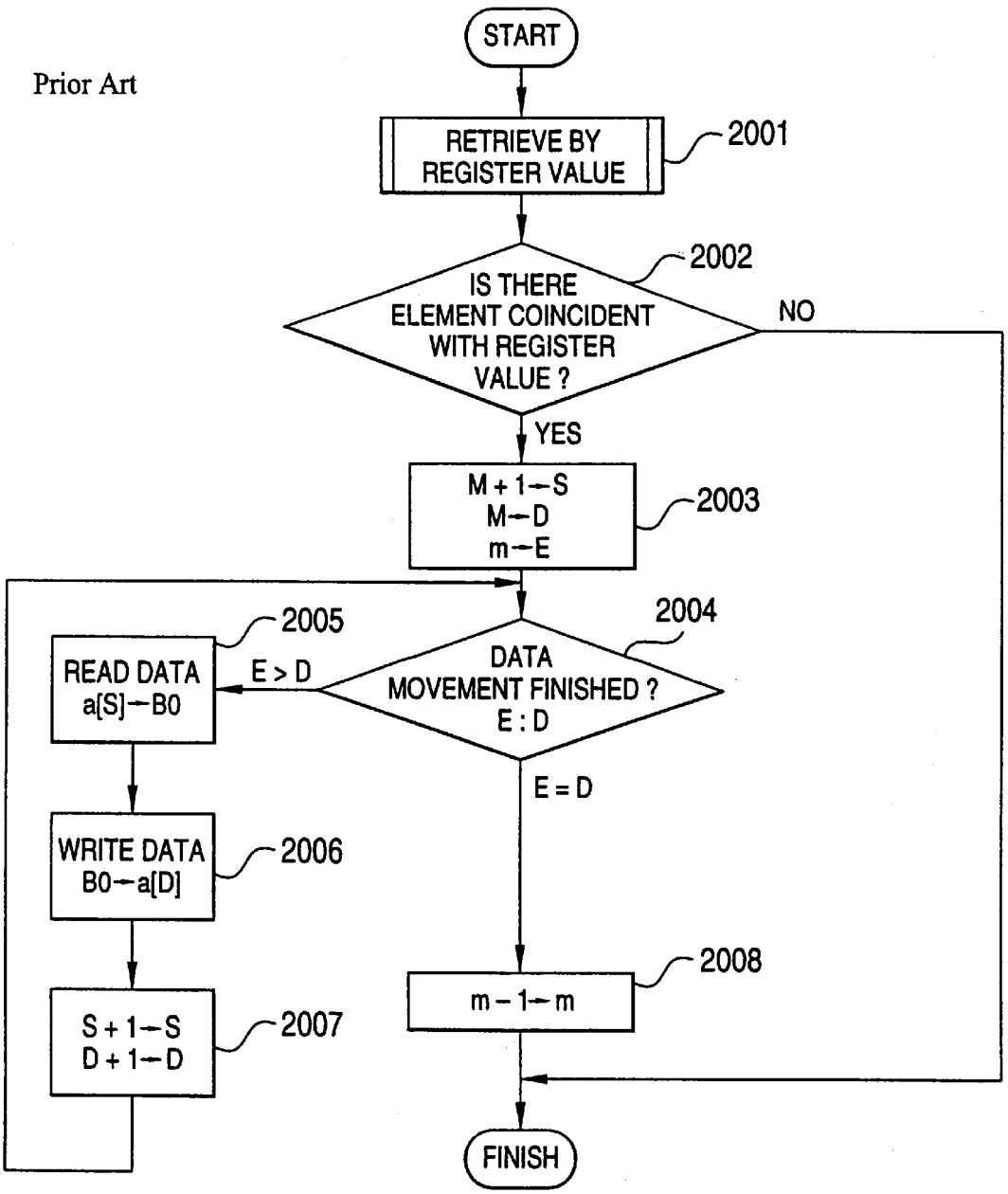
FIG. 20 is a diagram showing a flow of a conventional deletion operation.
Figure 21:
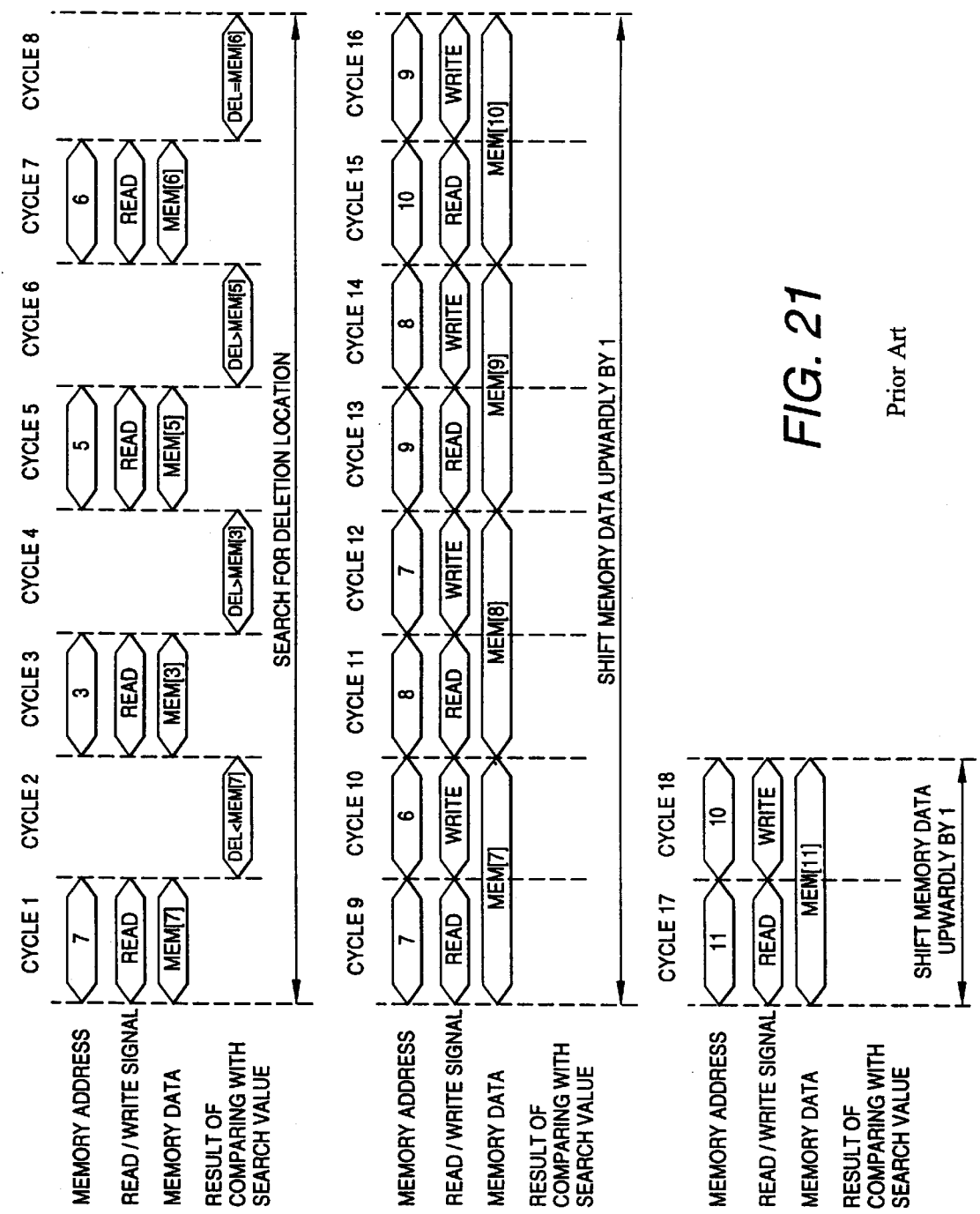
FIG. 21 is a diagram showing operational timings of the conventional deletion operation.

Conventionally, as shown by FIG. 15, a comparison cycle with the retrieval value KEY follows cycle 1. Based on a result of the comparison, data stored in one of address 3 or address 11 (corresponding to address pair B of FIG. 5) is outputted at cycle 3. Only one piece of data is outputted because, conventionally, data at both addresses (address 3 and address 11) cannot be given simultaneously.

However, according to the invention, the data at both addresses of the address pair B can simultaneously be outputted since the banks storing the two pieces of data are different from each other. Hence, as shown by FIG. 4, at cycle 2, the data at both addresses of the address pair B are read. In synchronism with the reading operation, MEM[7] (read at cycle 1) is compared with the retrieval key.

Although four addresses of address pairs C and D may be generated successive to the address pair B generated at cycle 2, from the result of the comparison between MEM[7] read at cycle 1 and the retrieval key, only one of address pair C or address pair D needs to be generated. That is, when KEY≦MEM[7], address pair C needs to be generated, and when KEY>MEM[7], address pair D needs to be generated. Either of the address pairs C and D is a pair of addresses associated with different banks and accordingly, data stored in the addresses can be outputted simultaneously. Thus, data stored in these addresses can be read at cycle 3.

Returning to the example, at this point, a result of KEY<MEM[7] is obtained at cycle 2, accordingly, data at the address pair C is read at cycle 3. Further, from the result of comparison at cycle 2, it is known data stored in which of the two addresses of the address pair B is to be compared with the retrieval key. In the present example, MEM[3] is compared with the retrieval key at cycle 3 which is the same cycle when data at address pair C are read. The above-described procedure is repeated.

However, final address pairs E through H, according to the present embodiment, belong to the same bank (bank 1) and thus, data cannot be read simultaneously. Accordingly, the address is determined from a result of comparison in a preceding cycle as in the conventional case. That is, an address pair following output of data read from the address pair C at cycle 3 is address pair F since KEY>MEM[3]. However, both of the addresses of the address pair F belong to bank 1 and thus, they cannot be generated at cycle 4.

Accordingly, at cycle 4, a comparison is made between the retrieval key and MEM[5] based on the comparison result at cycle 3. Based on the result of cycle 4, address 6 is outputted at cycle 5. Further, a final result is obtained at cycle 6.

An explanation will be given of operation of data registration according to the embodiment similar to the previously-described example. That is, assume that addresses of memories are 0 through 14, register data is designated by notation INS, data stored to the addresses 0 through 11 of the memories are respectively designated by notations MEM[0] through MEM[11] and nothing is registered at the address 12 and thereafter. In this example, the respective data have a relationship of MEM[0]<MEM[1]<MEM[2]< . . . <MEM[11] and MEM[5]<INS<MEM[6].

Figure 6:
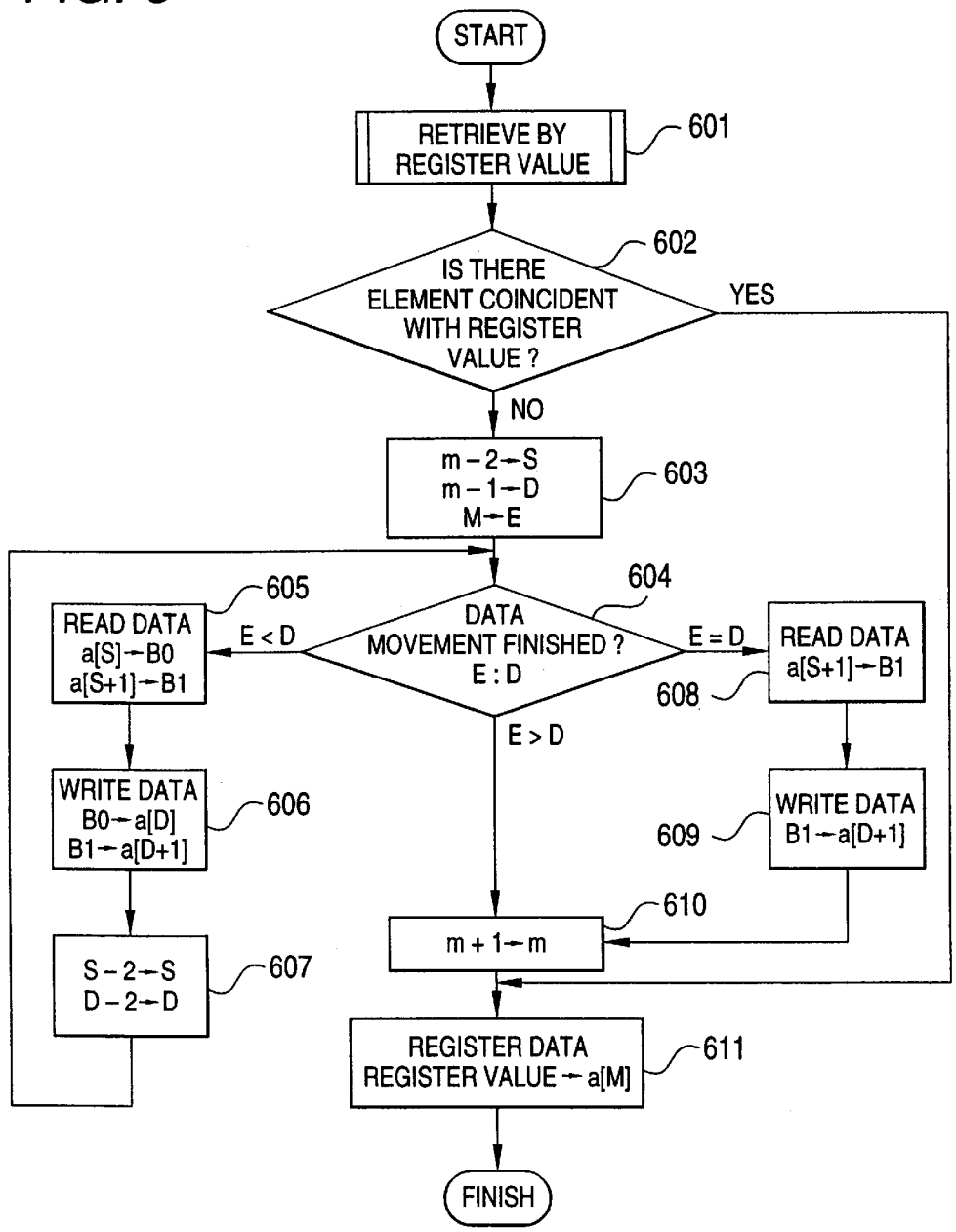
FIG. 6 is a diagram showing a register operation flow according to the embodiment.
Figure 7:
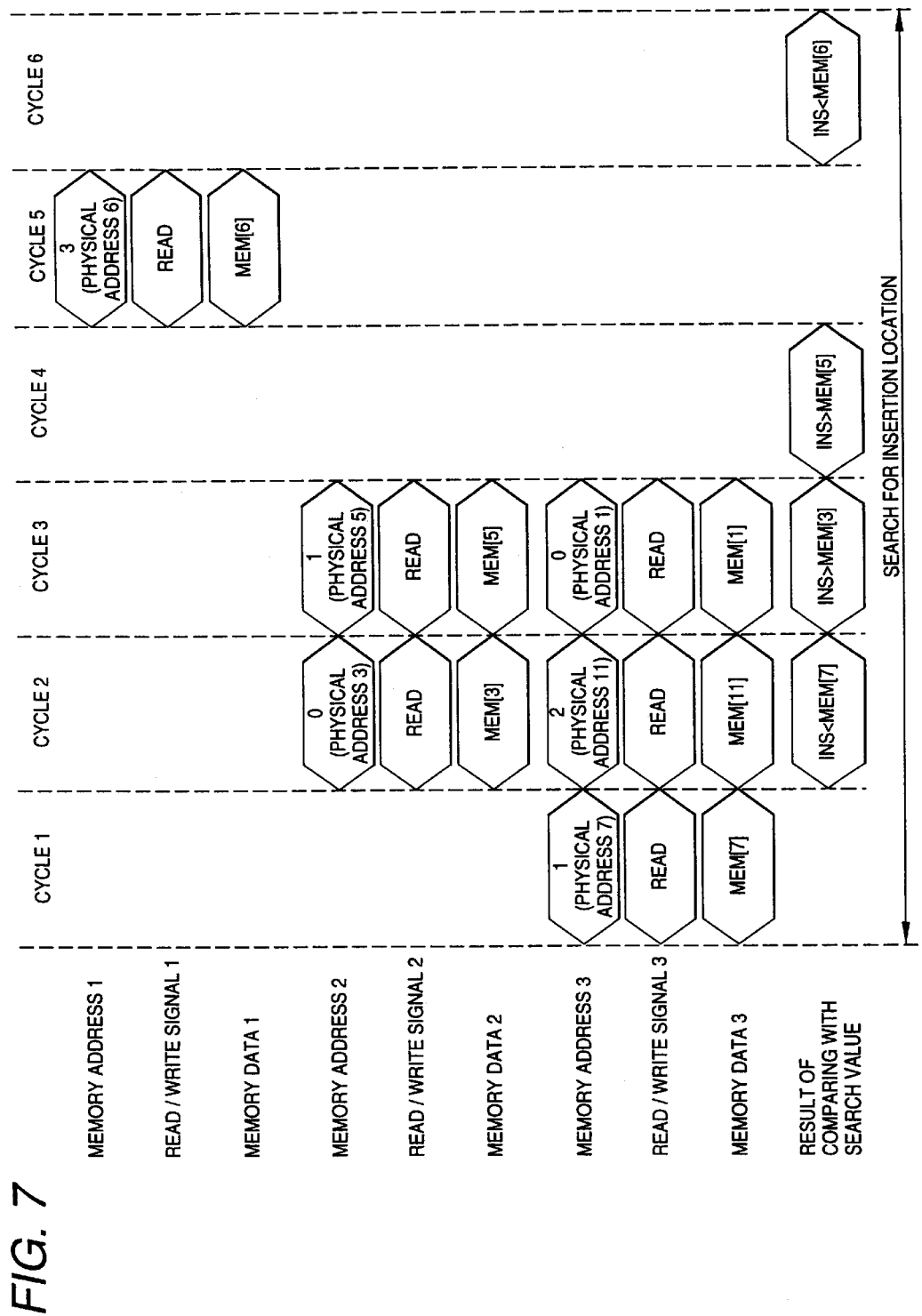
FIG. 7 is a diagram showing a former half of operational timings of the register operation according to the embodiment.
Figure 8:
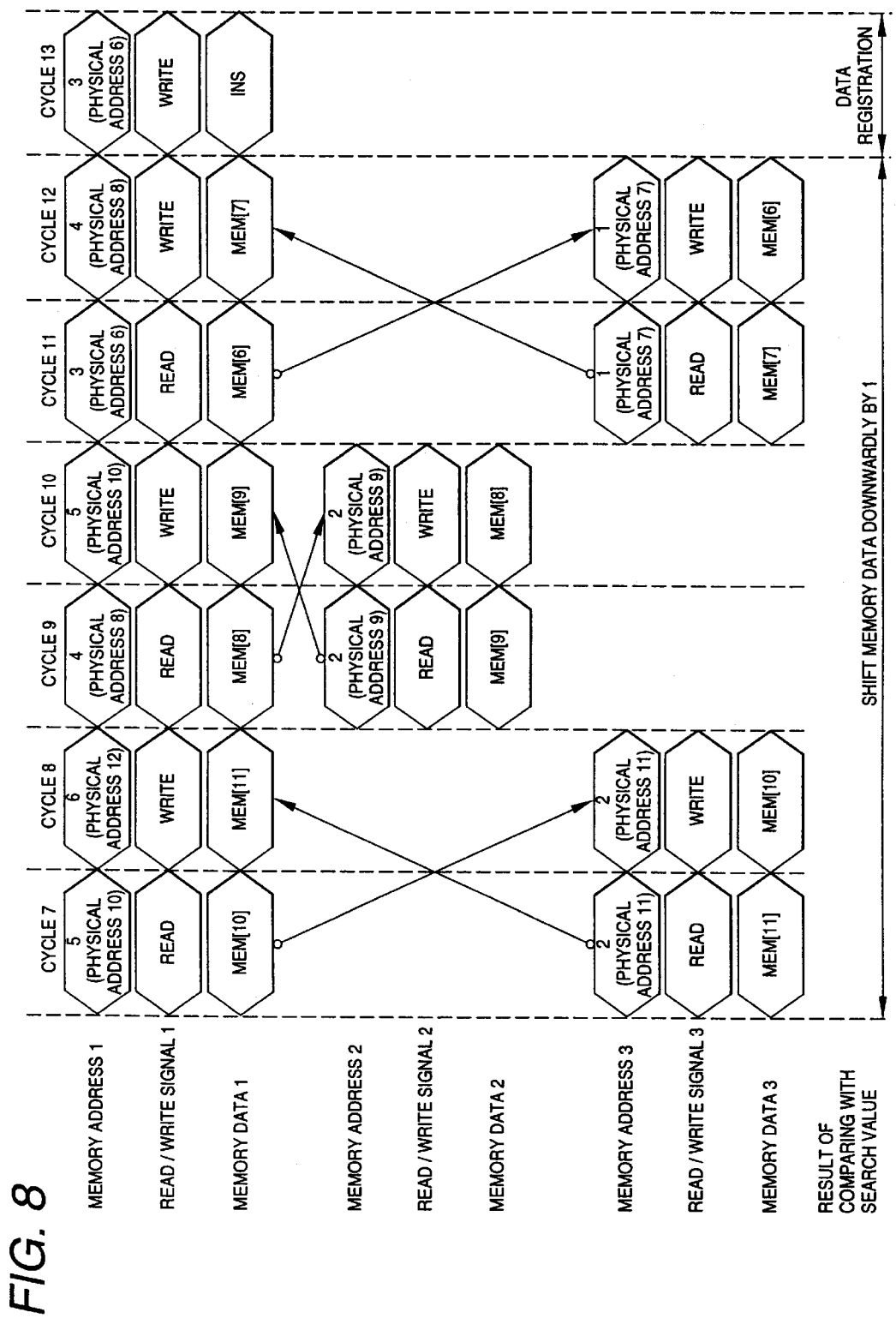
FIG. 8 is a diagram showing a latter half of the operational timings of the register operation according to the embodiment.

FIG. 6 shows a flow chart of a registering operation according to the embodiment. FIGS. 7 and 8 show a timing diagram of the register operation.

At step 601, the operation of retrieving a register location is the same s that in the previously-described retrieval operation (cycles 1 through 6) and accordingly, an explanation thereof will be omitted. At step 602, it is determined whether a register value is in coincidence with the register data INS. If there is a coincidence, the register value is overwritten by INS in the coincident address at step 611 and the operation is finished.

At step 603, S is set to m−2; D is set to m−1 and E is set to M. At step 604, E is compared with D to determine whether movement of data is finished. If E>D, movement of data is finished and accordingly, the effective element number m is incremented by 1 at step 610, the registered value INS is registered and the registering operation is finished at step 611. When E≦D, movement of data has not been finished and accordingly, movement of data is carried out.

Although conventionally, reading and writing operation is carried out in 2 cycles in respect of one piece of data, according to the invention, the memories are divided into even number addresses and odd number addresses to which access can be made simultaneously and accordingly, successive two addresses can simultaneously be read and written. Accordingly, two pieces of data can be moved in 1 cycle. However, when B=D, the remaining data to be moved is for 1 address and therefore, only 1 address is read at step 608 and the data is written at step 609.

At this point in the example, E<D and therefore, data stored in addresses 10 and 11 are read at step 605 (cycle 7) and are written to addresses 11 and 12 at step 606 (cycle 8). At step 607, S and D are decremented by 2, resulting in S=S, D=9.

The above steps 604 through 607 are repeated until E≧D (cycle 9 through cycle 12). When the operation is repeated three times, S=4, D=5 and E=6 and accordingly, E>D is satisfied at step 604, the effective element number m is incremented by 1 (step 610), the register value INS is written to the address M and the operation is finished at step 611 (cycle 13).

Next, an explanation will be given of operation of data deletion according to the embodiment similar to the previously-described example. Assume that addresses of memories are 0 through 14, data stored to the addresses 0 through 11 of the memories are respectively designated by MEM[0] through MEM[11] and nothing is registered at the address 12 and thereafter. In this case, the respective data have a relationship of MEM[0]<MEM[1]<MEM[2]< . . . <MEM[11] and DEL=MEM[6] where DEL is the deletion value.

Figure 9:
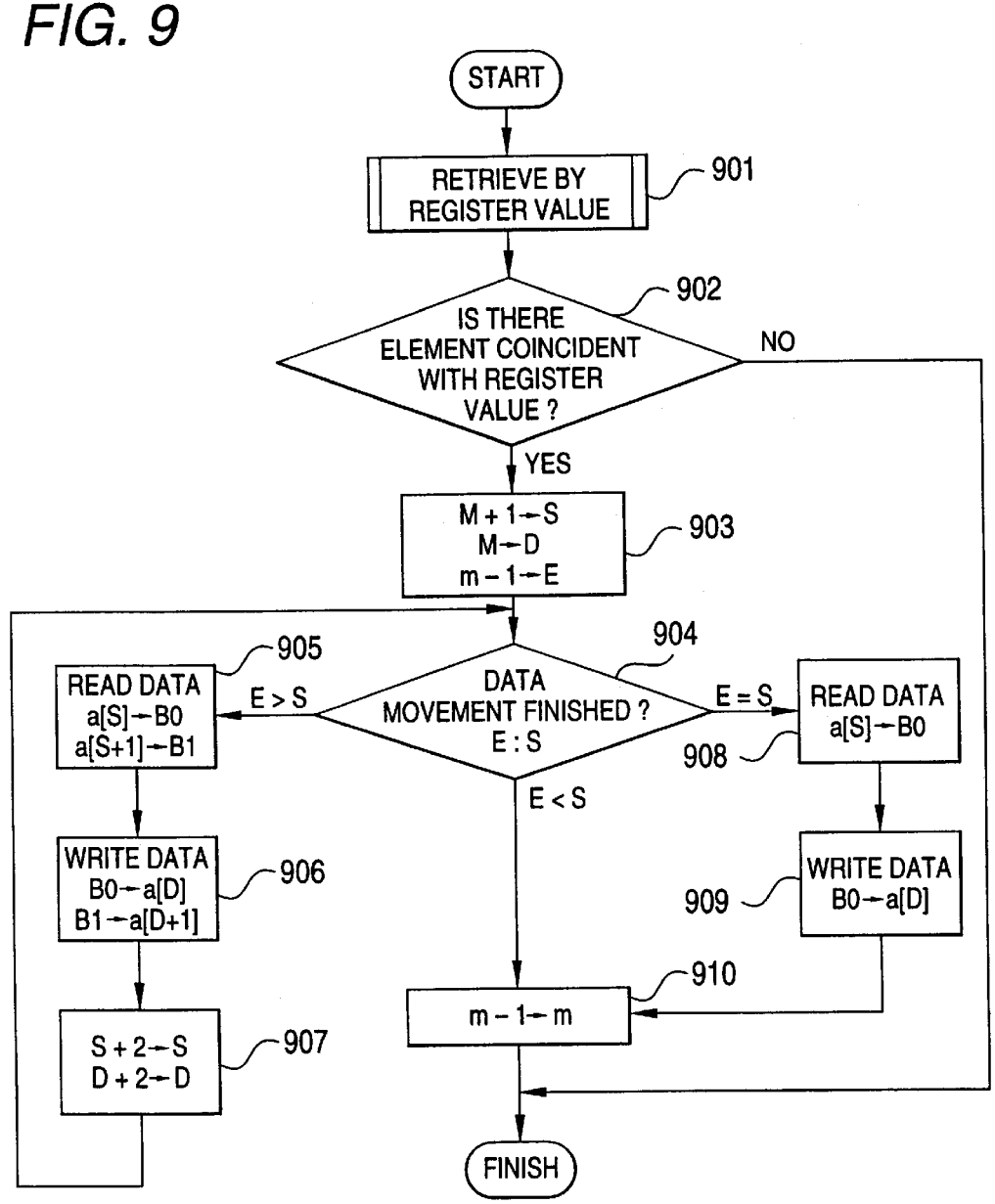
FIG. 9 is a diagram showing a deletion operation flow according to the embodiment.
Figure 10:
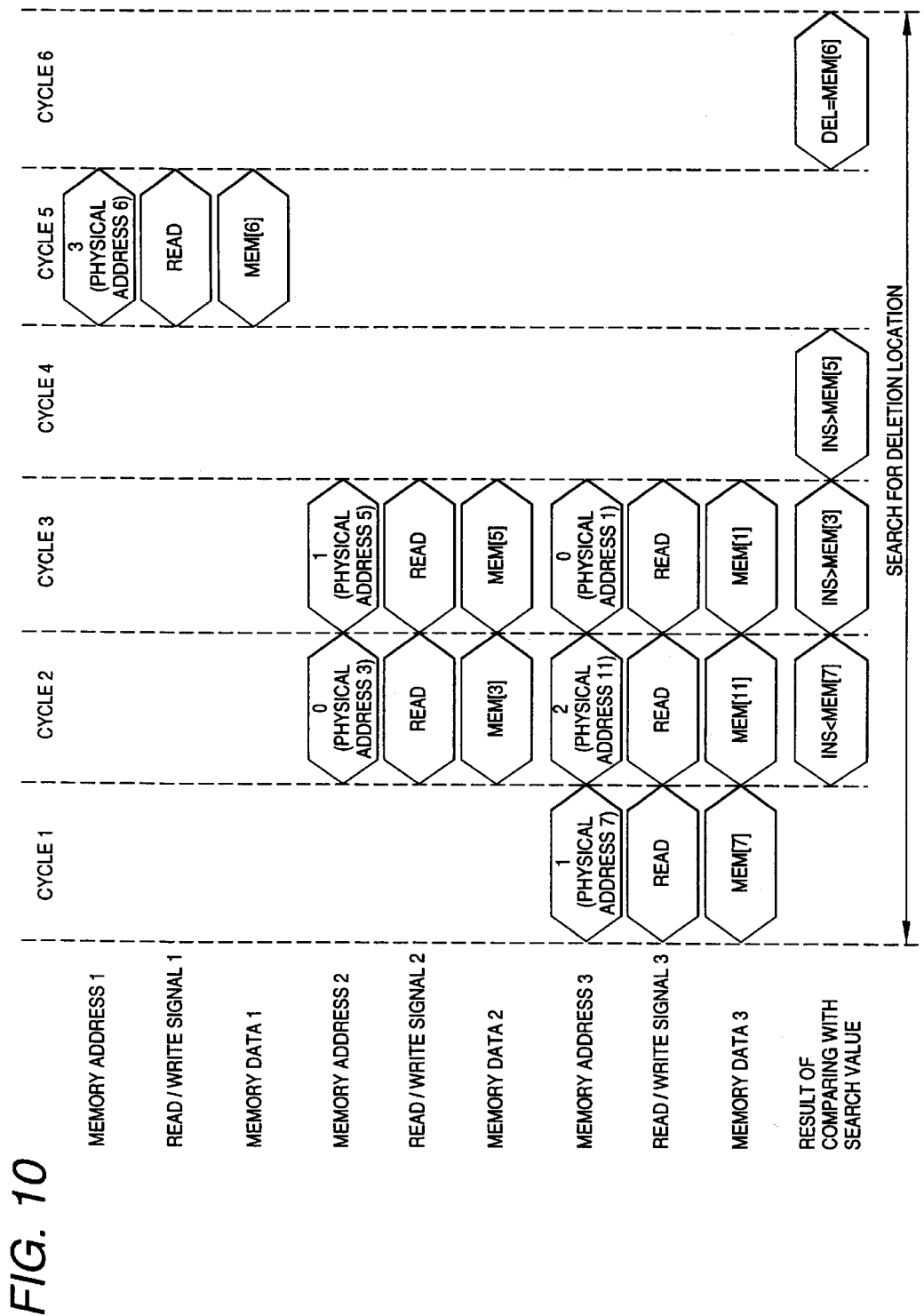
FIG. 10 is a diagram showing a former half of operational timings of the deletion operation according to the embodiment.
Figure 11:
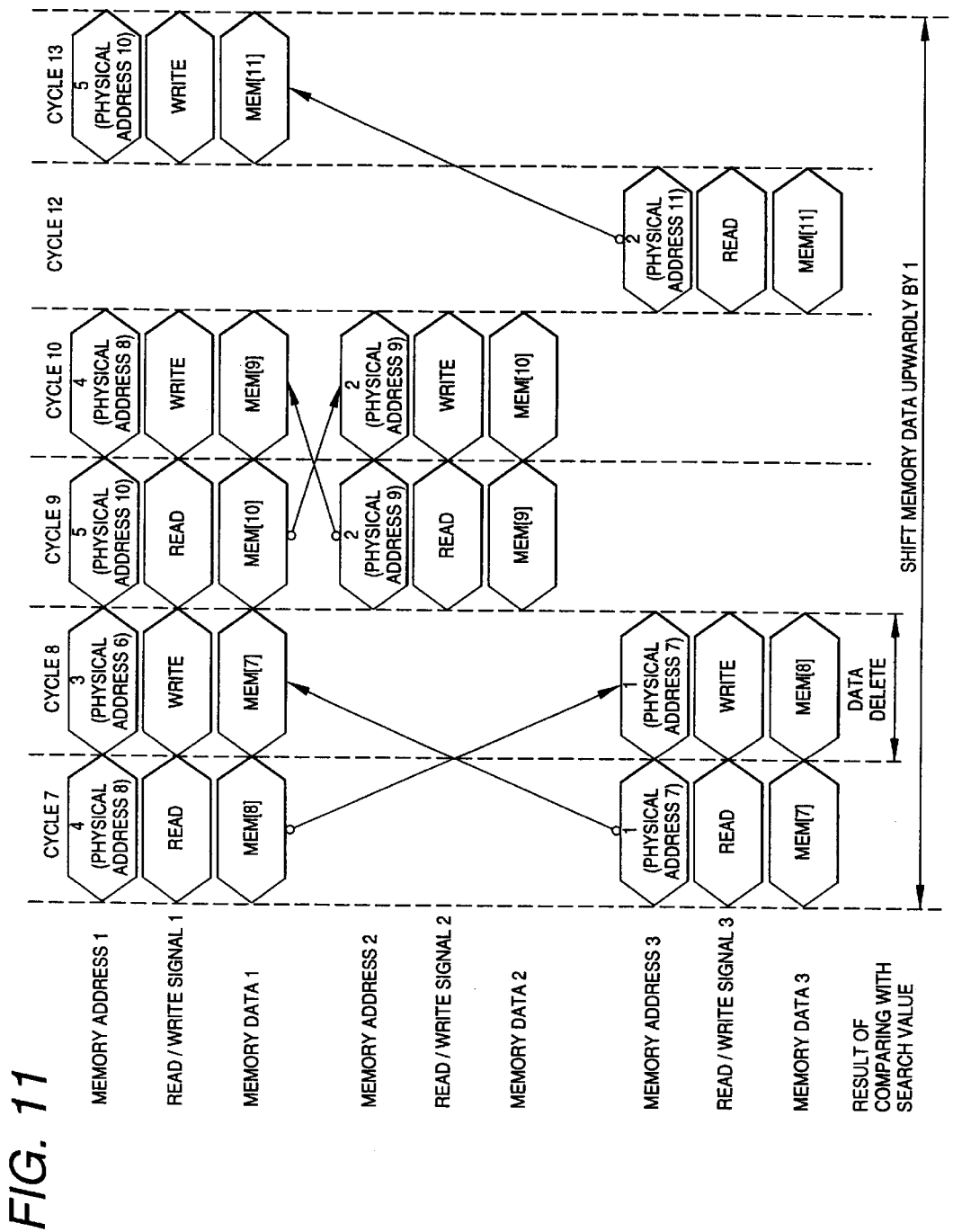
FIG. 11 is a diagram showing a latter half of the operational timings of the deletion operation according to the embodiment.
Figure 12:
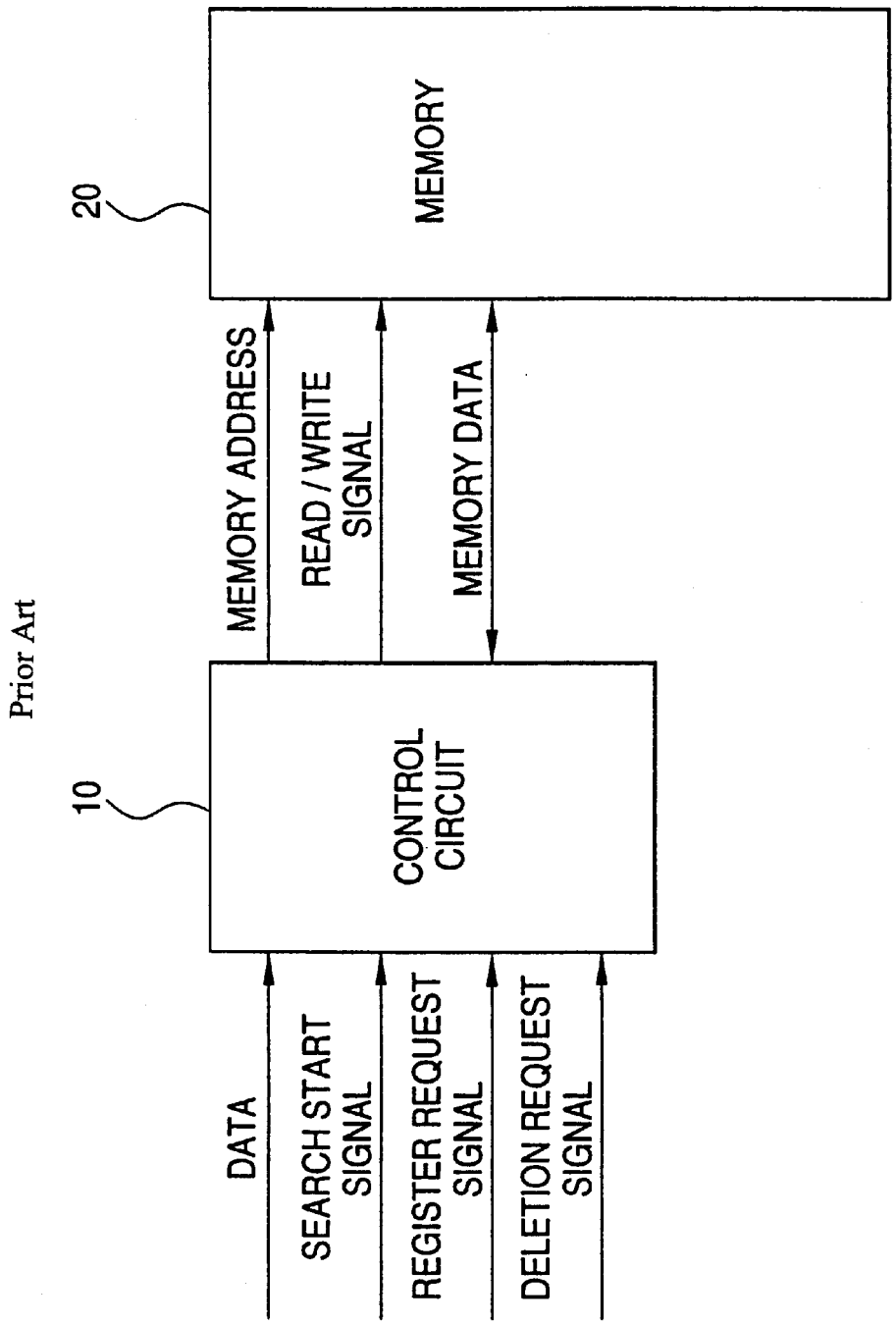
FIG. 12 is a block diagram showing an example of a constitution of a conventional data retrieval apparatus.
Figure 13:
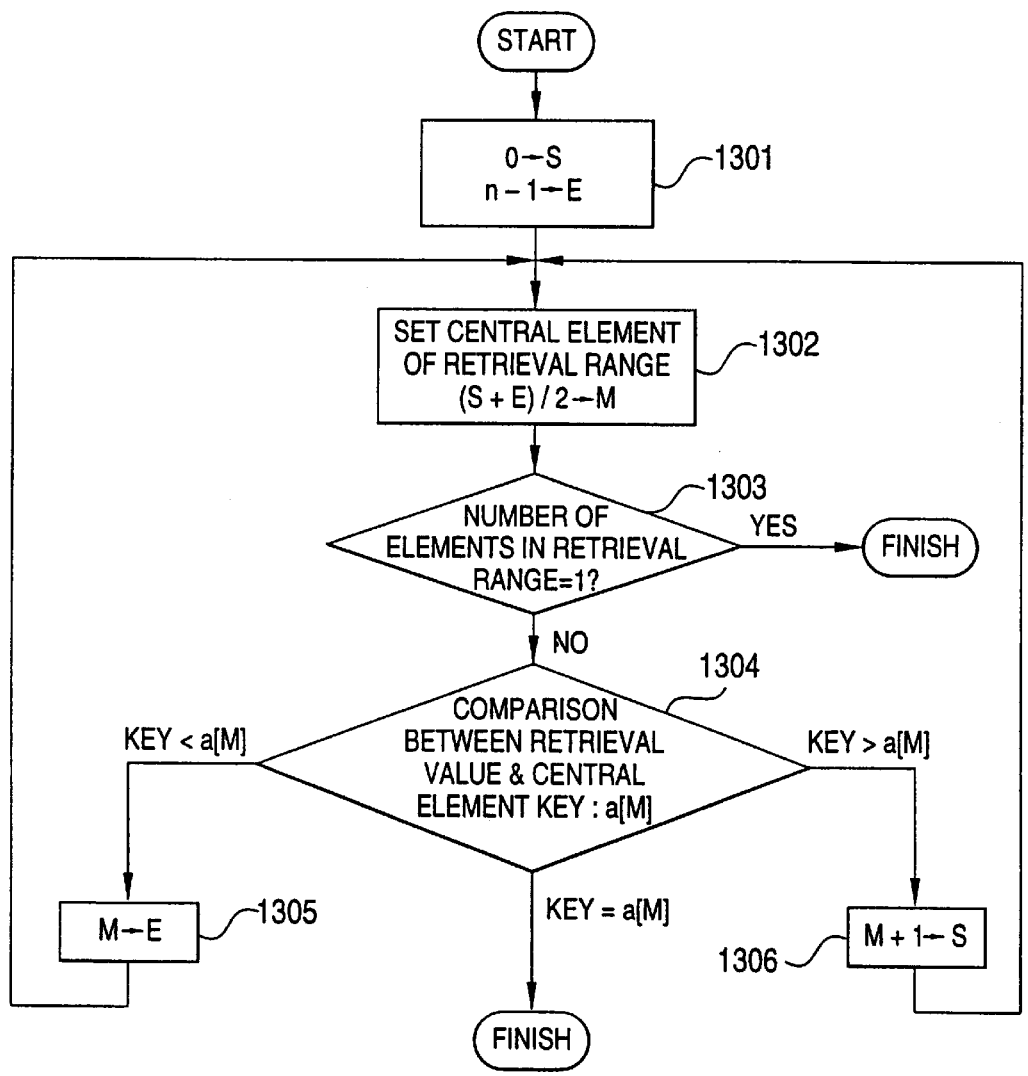
FIG. 13 is a diagram showing a flow of a conventional binary search method.

FIG. 9 shows a flow chart of a deletion operation according to the embodiment and FIGS. 10 and 11 show a timing diagram of the deletion operation. At step 901, an operation of retrieving a deletion location is the same as the previously-described retrieval operation (cycles 1 through 6) and accordingly, an explanation thereof will be omitted. At step 902, if there is no element in coincidence with the deletion value DEL, the deletion operation cannot be carried out and accordingly, the operation is finished.

At this point in the example (at step 902), there exists an element in coincidence with the deletion value DEL and the operation goes to step 903. An address storing the coincident element is designated by notation M and accordingly, MEM[M] constitutes a deletion object. At step 903, S is set to M+1=7; D is set to M=6; and E is set to m−1=11 and the operation goes to step 904.

At step 904, E is compared with S and a determination is made whether movement of data is finished. If E<S, movement of data is finished and accordingly, the effective element number m is decremented by 1 at step 910 and the deletion operation is finished. If E≧S, movement of data is not finished and therefore, movement of data continues.

Although conventionally, data is read and written in 2 cycles in respect of one piece of data, according to the invention, the memories can be divided into even number addresses and odd number addresses to which access can be made simultaneously and accordingly, successive two addresses can be read and written simultaneously. Accordingly, reading of data of 2 addresses or writing of data of 2 addresses can simultaneously be carried out in 1 cycle and two pieces of data can be moved in 2 cycles. However, when E=S, the remaining data to be moved is for 1 address and accordingly, only data of 1 address is read at step 908 and is written at step 909.

When E>S at step 904, data of 2 addresses of addresses 7 and 8 are read at step 905 (cycle 7) and are written to addresses 6 and 7 at step 906 (cycle 8). At step 907, S and D are incremented by 2 setting S=9 and D=8. The above steps 904 through 907 are repeated until E≦S (cycle 9 through cycle 10). When S=11, D=10, E=S is satisfied at step 904, data of address 11 is read at step 908 (cycle 11) and is written to address 10 at step 909 (cycle 12) and the deletion operation is finished.

According to the embodiment explained above, a bank (memory) is divided in three and accordingly, as shown by FIG. 4, at finial portions of retrieval operation (cycle 4 and cycle 5), comparison and reading cannot be carried out simultaneously. Although an explanation has been given by showing a simple example in this case, actually, the retrieval operation is carried out from data of a larger number and accordingly, there poses no significant problem even when comparison and reading cannot be carried out simultaneously only at final portions. However, when further acceleration is desired, the memory may be divided into four banks. That is, although even number addresses constitute one bank as a whole in FIG. 1, the even number addresses may be divided into 2 banks similar to the odd number addresses. In this way, the final portions of retrieval operation (*cycle 4 and cycle 5 shown by FIG. 4) can be carried out simultaneously and further accelerated.

Figure 22:
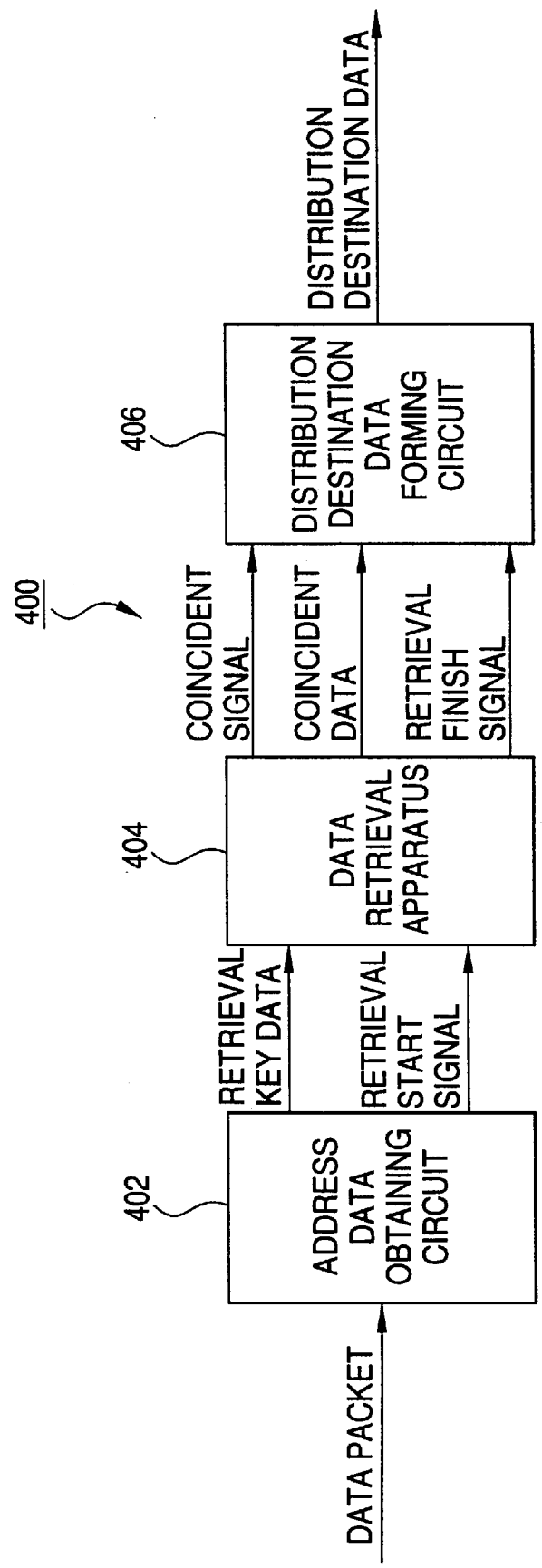
FIG. 22 is a block diagram showing a constitution of a data packet distributing system according to the invention.

An explanation will now be given to a data packet distribution system according to the invention. As shown by FIG. 22, the data packet distribution system 400 includes an address data obtaining circuit 402, the data retrieval apparatus 404 and a distributed destination data forming circuit 406.

In this case, the address data obtaining circuit 402 outputs address data, that is, retrieval key data from a data packet and a retrieval start signal to the data retrieval apparatus 404. The data retrieval apparatus 404 starts retrieval operation by the retrieval start signal. As described above, the data retrieval apparatus 404 carries out retrieval operation at high speed by carrying out comparison of data and reading of data constituting a successive comparison object in the same cycle.

Further, it is preferable that memories included in the data retrieval apparatus 404 are organized to have a retrieval object region storing register data and a nonretrieval object region storing associative data in correspondence with register data. By constituting a system in this way, based on retrieved coincident data, an operation of carrying out reading of corresponding associative data again is dispensed with and high speed total system processing is achieved. That is, data which is read for comparison is accompanied by corresponding associative data which may be outputted as a result of retrieval.

In the case of the data packet distribution system 400, the retrieval object region is stored with register data and the nonretrieval object region is stored with data capable of forming distribution data. A result of retrieval at the data retrieval apparatus 404, that is, a coincidence signal, coincidences data, a retrieval finish signal are outputted to the distributed destination data forming circuit 406. The distributed destination data forming circuit 406 forms distributed destination data by referring to the coincidence signal and the coincidences data along with the retrieval finish signal.

Although the system 400 is divided into the address data obtaining circuit 402, the data retrieval apparatus 404 and the distributed destination data forming circuit 406, naturally, an integrated signal unit may be constituted. According to such a system, in order to carry out a retrieval operation at high speed with address data sampled from the data packet as key data, there are provided (I) a control circuit for carrying out an operation of comparing register data constituting a retrieval object stored in a memory with address data constituting key data and an operation of reading register data constituting an object of a successive comparison in the same cycle and (II) an address converting circuit in which in the case where a logical address space is divided into 2 banks of a bank constituting a set of even number addresses and a bank constituting a set of odd number addresses and either or both of the 2 banks are expressed by binary numbers and are divided into a bank constituting a set of addresses where an even number of bits of "1" are present and a bank constituting a set of addresses where an odd number of bits of "1" are present, a total of 3 or 4 of banks of the logical address space are mapped in respectives of physical address spaces of a plurality (preferably, 3 or 4) of memories.

As has been explained, according to the invention, when the memories are divided into three banks, the operation of reading from memories constituting the constituent elements of the retrieval operation and the operation of comparison can simultaneously be carried out except the final reading operation and comparing operation of a series of retrieval operations and accordingly, the retrieval operation can be finished by a number of cycles which is substantially a half of that of the conventional case.

Operation of registering or deleting data is grossly classified into retrieval operation and movement of memory data. According to the present invention, in respect of retrieval operation in register or deletion operation, the operation can be finished by a number of cycles of substantially a half of that of the conventional case similar to the above-described retrieval operation. Further, the memories are divided into even number addresses and odd number addresses and accordingly, in respect of movement of memory data, reading operation can be carried out simultaneously from successive 2 addresses in 1 cycle or writing operation can be carried out simultaneously to successive 2 addresses in 1 cycle and the operation can be finished by a number of cycles of substantially a half of that of the conventional case and accordingly, also in respect with operation of registering and deleting data, the operation can be finished by a number of cycles of substantially a half of that of the conventional case.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A data retrieval apparatus, comprising:
   a plurality of memories;
   an address converting device that maps logical addresses into physical addresses of the memories; and
   a control device that controls a data retrieval using binary search operation for searching through data values stored in the memories to retrieve retrieval data based on a given key data, the control device providing two logical addresses to the address converting device for retrieving two of the data values from two physical addresses of the memories in a same cycle during the binary search operation.

2. The data retrieval apparatus according to claim 1, wherein the logical addresses are divided into a first bank, a second bank, and a third bank, the first bank including even logical addresses, the second bank including odd logical addresses having binary values with odd numbers of "1"s, and the third bank including odd logical addresses having binary values with even numbers of "1"s, the first, the second and the third banks of logical addresses correspond to a first memory, a second memory and a third memory, respectively, of the memories, the first, the second, and the third memories being independently addressable, the data values addressed by the first, the second and the third banks of logical addresses being stored in the first, the second and the third memories respectively.

3. The data retrieval apparatus according to claim 2, wherein the first bank includes only even addresses having binary values with odd numbers of "1"s and a fourth bank including even addresses having binary values with even numbers of "1"s, the logical addresses of the fourth bank correspond to a fourth memory of the memories and the fourth memory being independently addressable from the first, the second and the third memories, the data values addressed by the logical addresses of the fourth bank being stored in the fourth memory.

4. The data retrieval apparatus according to claim 3, wherein the even and odd logical addresses are interchanged.

5. The data retrieval apparatus according to claim 2, wherein the even and odd logical addresses are interchanged.

6. The data retrieval apparatus according to claim 1, wherein the memories store the data values in an ascending order or a descending order, and the control device identifies an insertion position by using the binary search operation, the insertion position dividing the data values into first data values and second data values, the control device making room for an insertion data value by moving either the first or the second data values by one logical address position so that an order of the data values including the insertion value is maintained.

7. The data retrieval apparatus according to claim 1, wherein the memories store the data by aligning the data in an ascending order or a descending order, and the control device searches for an object of deletion using the binary search operation and identifies a logical addresses of the object of deletion which divides the data values into first data values and second data values, the control device deleting the object of deletion by moving either the first data values or the second data values by one logical address position to overwrite the object of deletion while maintaining an order of remaining data values in the memories.

8. The data retrieval apparatus according to claim 1, wherein the memories store the data values in either an ascending order or a descending order, and the retrieval apparatus identifies either an insertion position or a deletion position based on a key data by using the binary search operation, the insertion or deletion positions dividing the data values into first data values and second data values, the data retrieval apparatus either making room for one insertion data or deleting an object of deletion by moving either the first or the second data values while maintaining an order of the data values.

9. The data retrieval apparatus according to claim 1, wherein the memories include a first region for storing register data as the data values which are objects of the binary search operation, and a second region for storing data associated with the register data one of the data in the second region accompanying a result of the retrieval of the register data.

10. A data packet distribution system comprising:
    an address data obtaining device for obtaining address data from a data packet;
    a data retrieval apparatus for retrieving a coincidence data, the data retrieval apparatus performing compare and read operations in a same cycle, the compare operation comparing the address data with a first register data read from a plurality of memories and the read operation reading second register data for a next compare operation; and
    a distributed destination data forming device for forming distributed destination data based on the coincidence data, a retrieval finish signal and a coincidence signal retrieved by the data retrieval apparatus.

11. The data packet distribution system according to claim 10, wherein the data retrieval apparatus comprises:
    the plurality of memories;
    an address converting device that maps logical addresses of the registered data into physical addresses of the memories, the logical addresses being divided into a plurality of banks, register data stored in memories corresponding to different ones of the banks are capable of being read from the memories during the same cycle; and
    a control device that controls a binary search operation to retrieve the coincident data that corresponds to the address data, the control device providing two or more logical addresses of the second register data to the address converting device for retrieving the second register data from the memories in the same cycle.

12. The data packet distribution system according to claim 11, wherein the memories store the register data in a first region and stores the distributed destination data in a second region.

13. The data packet distribution system according to claim 12, wherein corresponding ones of the register data and the distributed destination data are stored in corresponding addresses in the first and second regions of the memories.

14. The data packet distribution system according to claim 10, wherein the data retrieval apparatus comprises:
a plurality of memories;
an address converting device that maps logical addresses into physical addresses of the memories; and
a control device that controls a binary search operation for retrieval of the coincident data that corresponds to the address data, the control device providing two logical addresses to the address converting device for retrieving two register data from two physical addresses of the memories in the same cycle during the binary search operation.

15. The data packet distribution system according to claim 14, wherein the logical addresses are divided into a first bank, a second bank, and a third bank, the first bank including even logical addresses, the second bank including odd logical addresses having binary values with odd numbers of "1"s, and the third bank including odd logical addresses having binary values with even numbers of "1"s, the first, the second and the third banks of logical addresses correspond to a first memory; a second memory and a third memory, respectively, of the memories, the first, the second, and the third memories being independently addressable, the register data addressed by the first, the second and the third banks of logical addresses being stored in the first, the second and the third memories, respectively.

16. The data packet distribution system according to claim 15, wherein the first bank includes only even addresses having binary values with odd numbers of "1"s and a fourth bank including even addresses having binary values with even numbers of "1"s, the logical addresses of the fourth bank correspond to a fourth memory of the memories and the fourth memory being independently addressable from the first, the second and the third memories, the register data addressed by the logical addresses of the fourth bank being stored in the fourth memory.

17. The data packet distribution system according to claim 16, wherein the even and odd logical addresses are interchanged.

18. The data packet distribution system according to claim 15, wherein the even and odd logical addresses are interchanged.

19. The data packet distribution system according to claim 14, wherein the memories store the register data in a first region and stores the distributed destination data in a second region.

20. The data packet distribution system according to claim 19, wherein corresponding ones of the register data and the distributed destination data are stored in corresponding addresses in the first and second regions of the memories.

21. A method for searching for a retrieval key in a plurality of data elements that are stored in an order based on magnitudes of the data elements, comprising:
(a) retrieving a center data element from the data elements;
(b) comparing the center data element with the retrieval key to generate a compare result, and concurrently retrieving a greater data element and a lesser data element from the data elements;
(c) selecting either the greater or the lesser data elements as the center data element based on the compare result; and
(d) repeating steps (b) and (c) until a desired difference between addresses of the greater and the lesser data elements is reached; and
(e) outputting a retrieval address of a last center data element.

22. The method of claim 21, further comprising:
storing data elements having even logical addresses in a first memory;
storing data elements having odd logical addresses that have binary values with an even number of "1"s in a second memory; and
storing data elements having odd logical addresses that have binary values with an odd number of "1"s in a third memory, the first, second and third memories being independently readable.

23. The method of claim 22, further comprising:
storing data elements having even logical addresses that have a binary value with an even number of "1"s in the first memory; and
storing data elements having an even logical addresses that have a binary value with and odd number of "1"s in a fourth memory.

24. A data retrieval apparatus, comprising:
a plurality of memories;
an address converting device that maps logical addresses into physical addresses of the memories, the logical addresses being divided into a plurality of banks, register data stored in the memories corresponding to different ones of the banks are capable of being read during a same cycle; and
a control device that controls a binary search operation to perform a register data retrieval based on a given key data, the control device providing a plurality of logical addresses to the address converting device for retrieving a plurality of registered data from a plurality of physical addresses of the memories in the same cycle during the binary search operation.

* * * * *